US011046218B2

(12) United States Patent
Metten et al.

(10) Patent No.: US 11,046,218 B2
(45) Date of Patent: Jun. 29, 2021

(54) SEAT FRAME FASTENING ASSEMBLY, SEAT FRAME, VEHICLE PORTION AND VEHICLE HAVING A SEAT FRAME FASTENING ASSEMBLY

(71) Applicant: Airbus Operations GmbH, Hamburg (DE)

(72) Inventors: Martin Metten, Hamburg (DE); Michael Telkamp, Hamburg (DE); Hermann Benthien, Hamburg (DE); Surya Utomo, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 101 days.

(21) Appl. No.: 16/450,126

(22) Filed: Jun. 24, 2019

(65) Prior Publication Data

US 2020/0001752 A1 Jan. 2, 2020

(30) Foreign Application Priority Data

Jun. 29, 2018 (DE) .................... 10 2018 115 776.2

(51) Int. Cl.
*B60N 2/30* (2006.01)
*B64D 11/06* (2006.01)
*B60N 2/68* (2006.01)

(52) U.S. Cl.
CPC ............ *B60N 2/305* (2013.01); *B60N 2/3011* (2013.01); *B60N 2/682* (2013.01); *B64D 11/0696* (2013.01)

(58) Field of Classification Search
CPC .... B60N 2/0305; B60N 2/3011; B60N 2/682; B64D 11/0696
See application file for complete search history.

(56) References Cited

U.S. PATENT DOCUMENTS 3,790,234 A * 2/1974 Fuelling .................... B60N 2/06
384/34
5,620,161 A * 4/1997 Wisner .................... B60N 2/015
248/429

(Continued)

FOREIGN PATENT DOCUMENTS

EP 3363737 A1 8/2018
FR 2935682 A1 3/2010

OTHER PUBLICATIONS

German Search Report; priority document.

*Primary Examiner* — Lori L Lyjak
(74) *Attorney, Agent, or Firm* — Greer, Burns & Crain Ltd.

(57) ABSTRACT

A seat frame fastening assembly for laterally fastening a seat frame in a vehicle, wherein the seat frame fastening assembly comprises a holding rail arranged in a longitudinal direction of the vehicle, and a lateral element laterally fastened to a seat frame and coupled to the holding rail. The holding rail comprises a first power- and/or data-transfer interface and the lateral holding element comprises a second power- and/or data-transfer interface. The second power- and/or data-transfer interface is furthermore arranged in the lateral holding element such that a position of the second power- and/or data-transfer interface corresponds to a position of the first power- and/or data-transfer interface when the lateral holding element is coupled to the holding rail. Furthermore, a seat frame has such a seat frame fastening assembly, a vehicle portion has a corresponding seat frame and a vehicle has such a vehicle portion.

19 Claims, 16 Drawing Sheets

(56) References Cited

U.S. PATENT DOCUMENTS

| | | | |
|---|---|---|---|
| 6,568,735 B1 * | 5/2003 | Lohr | B60N 2/242 |
| | | | 296/63 |
| 2011/0260003 A1 | 10/2011 | Guering et al. | |
| 2014/0263891 A1 * | 9/2014 | Landskron | B60N 2/0232 |
| | | | 248/205.1 |
| 2017/0155268 A1 | 6/2017 | Ayotte | |

* cited by examiner

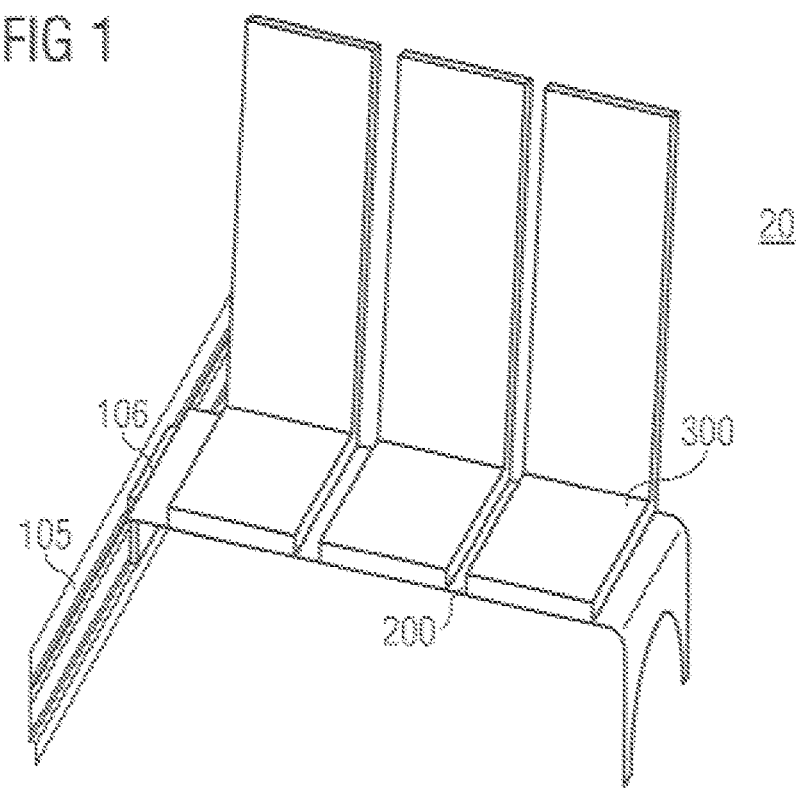
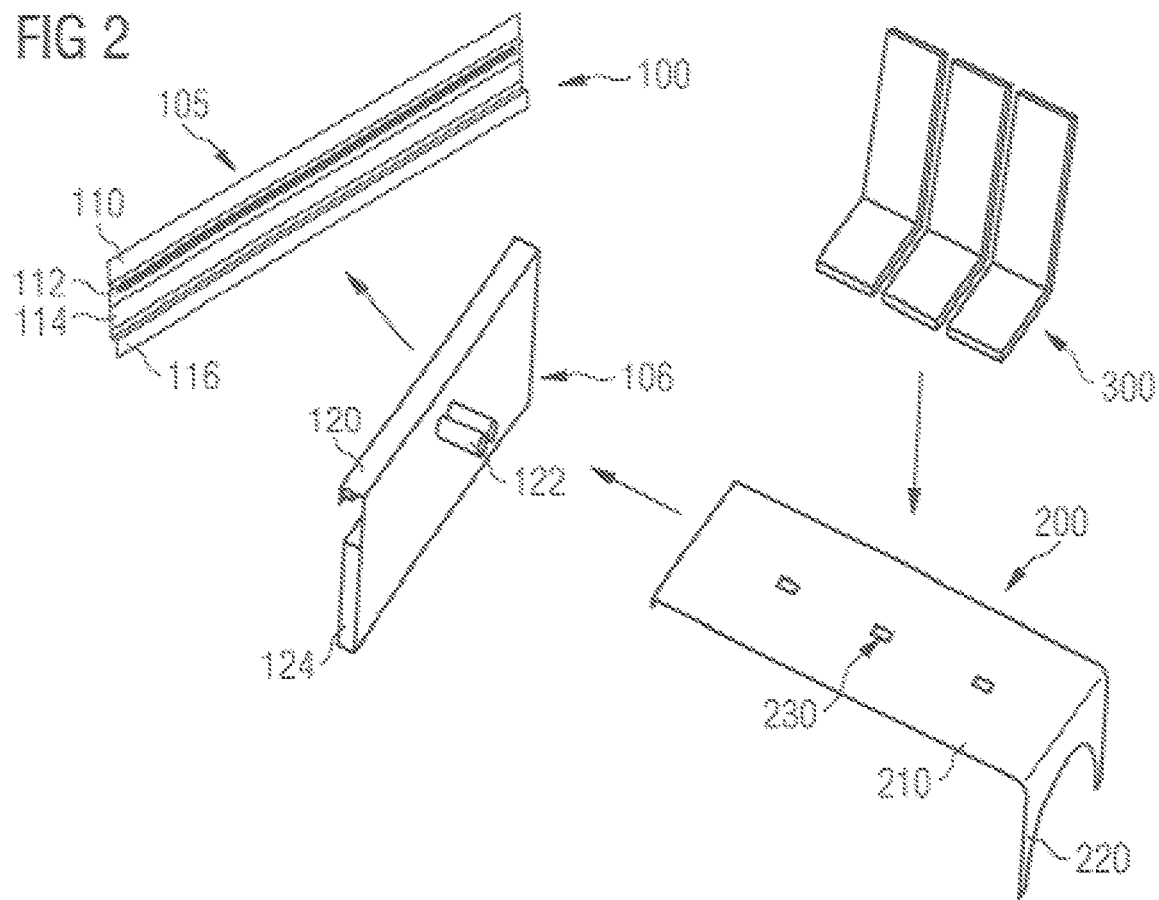

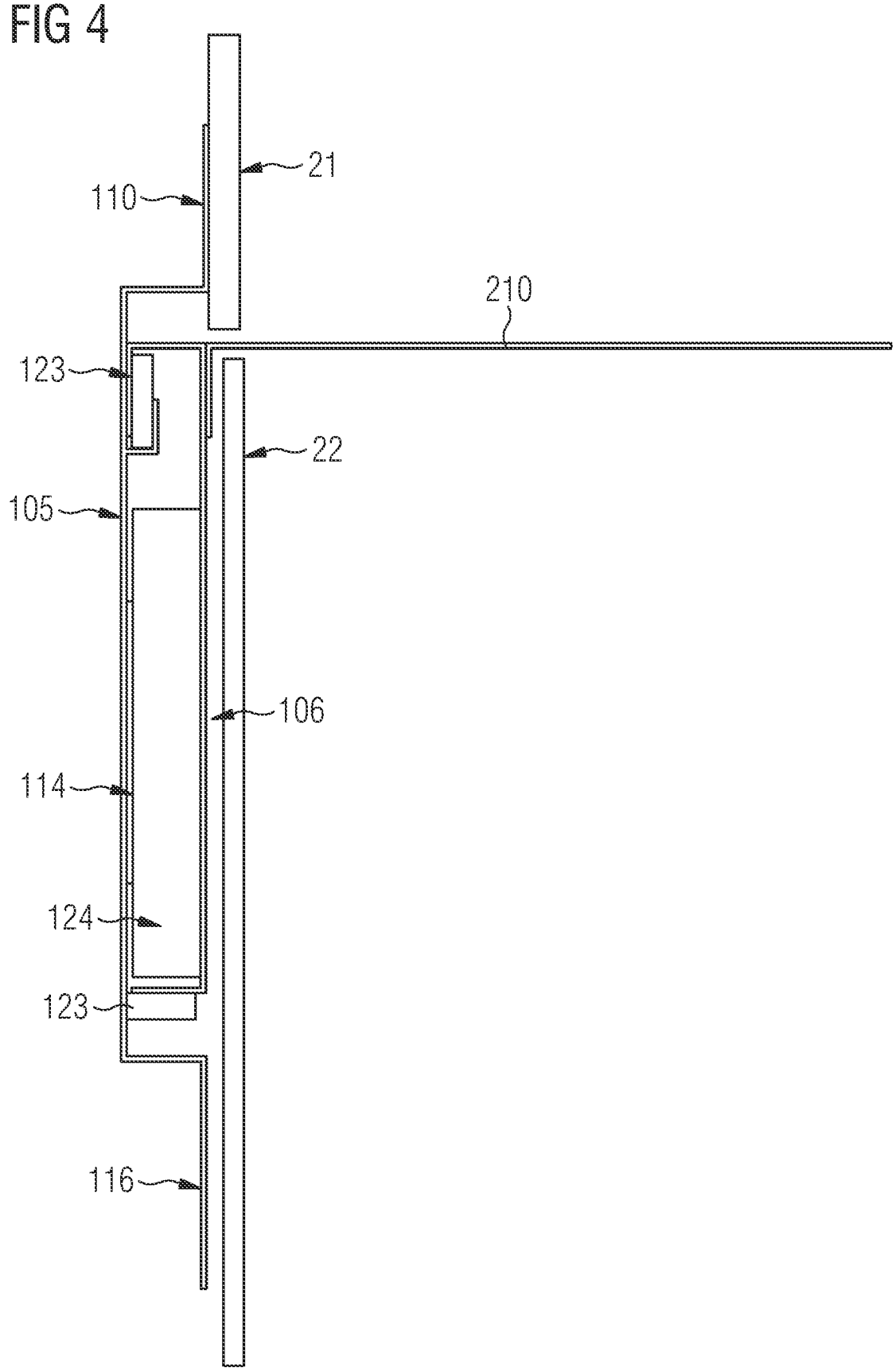

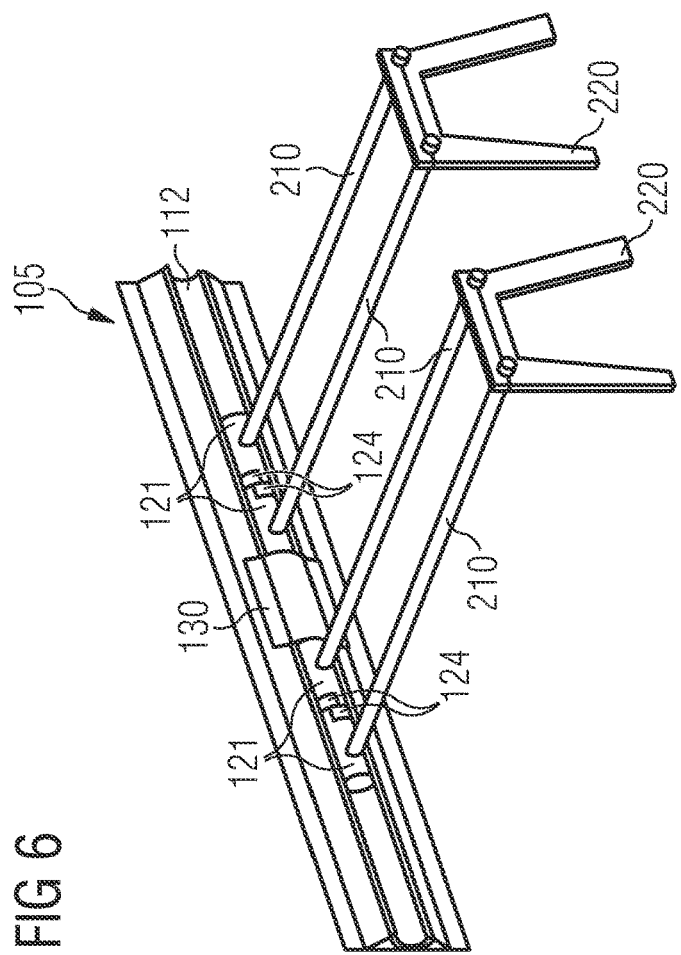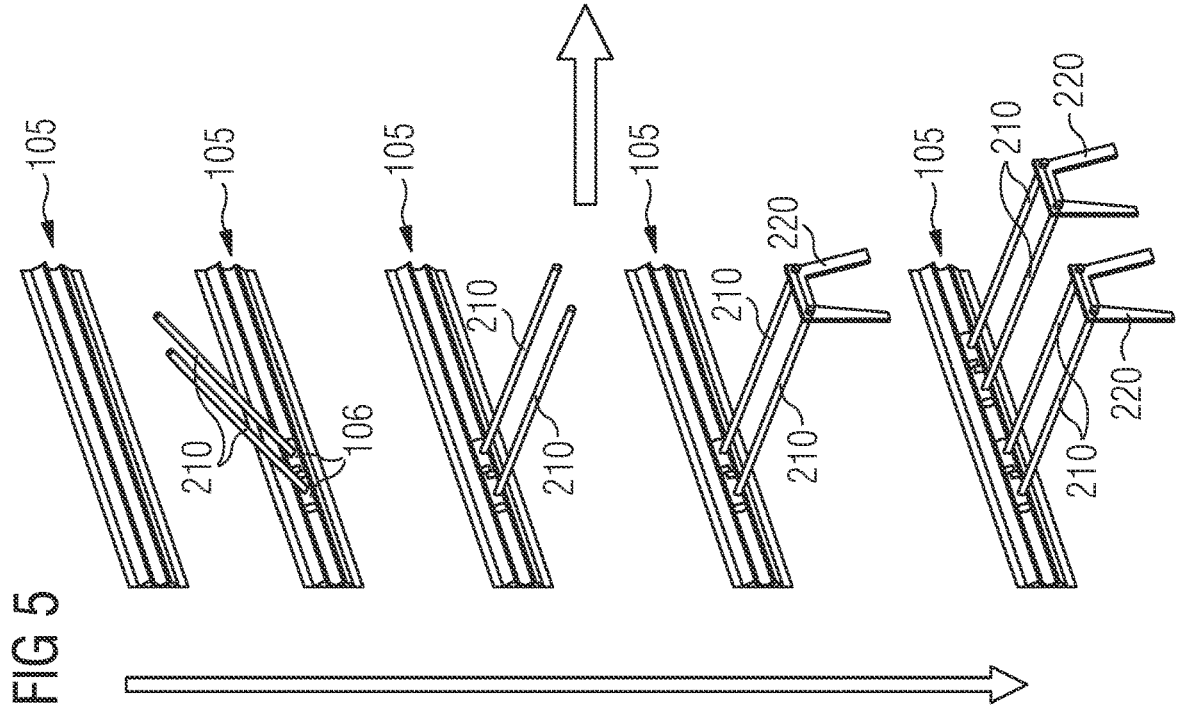

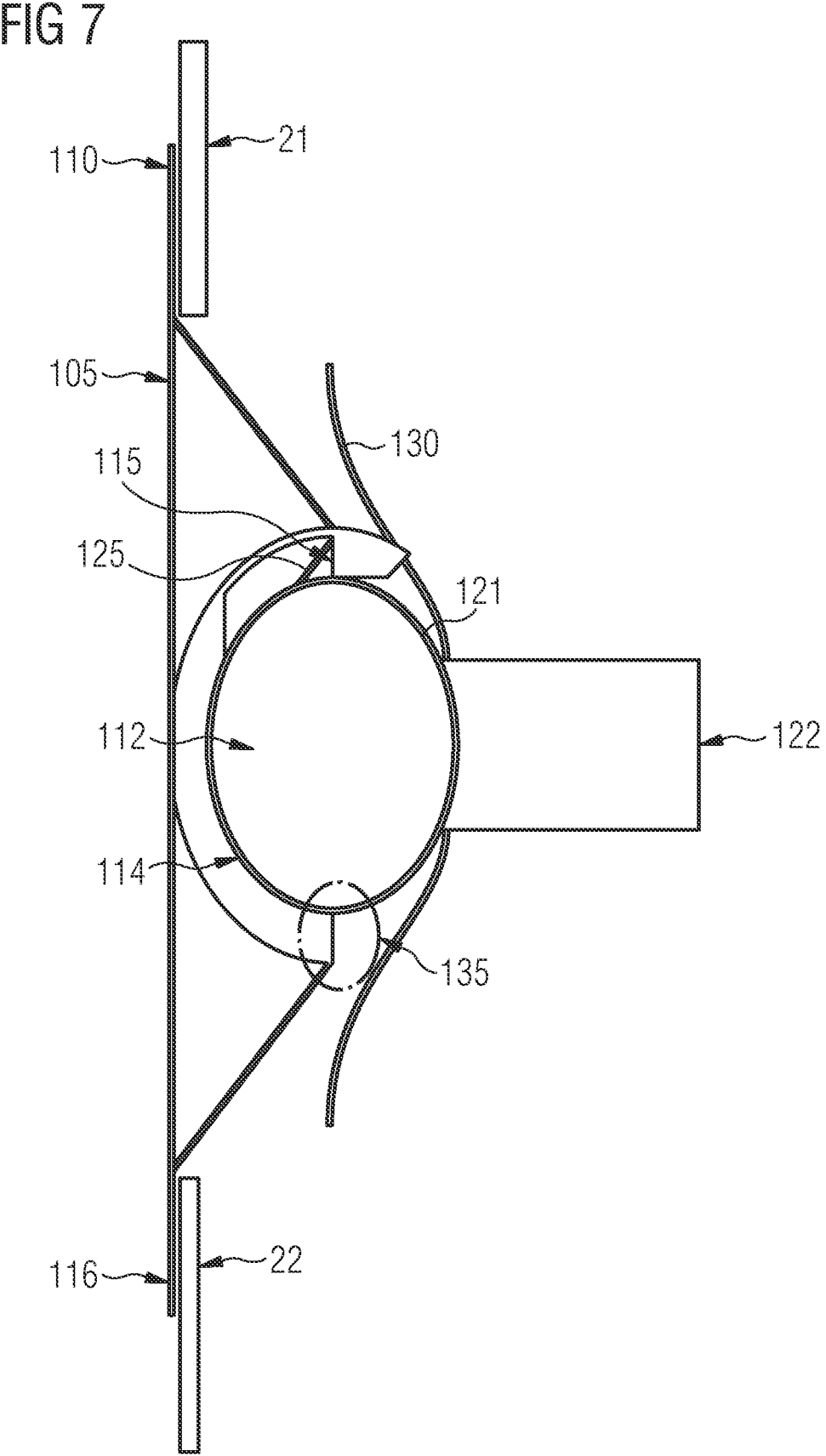

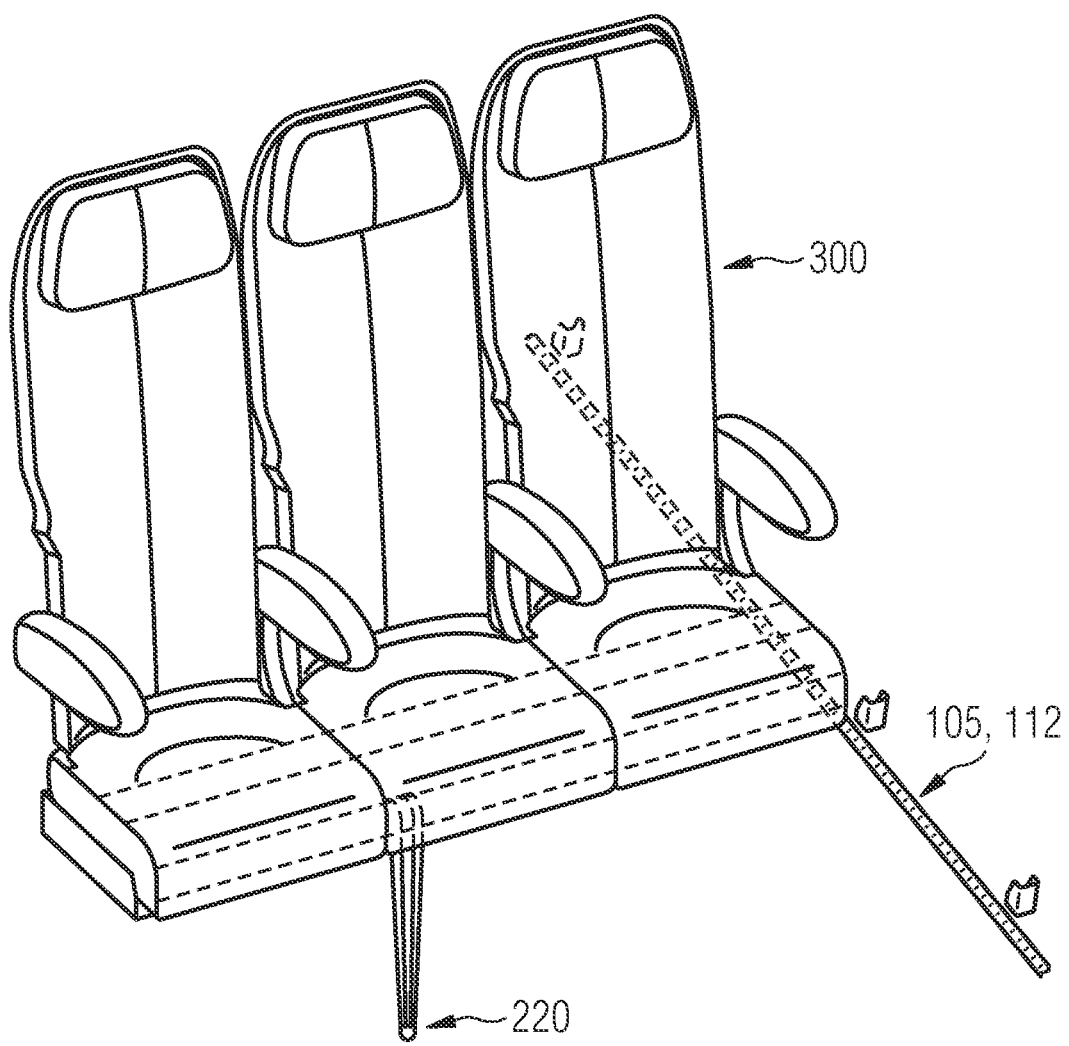

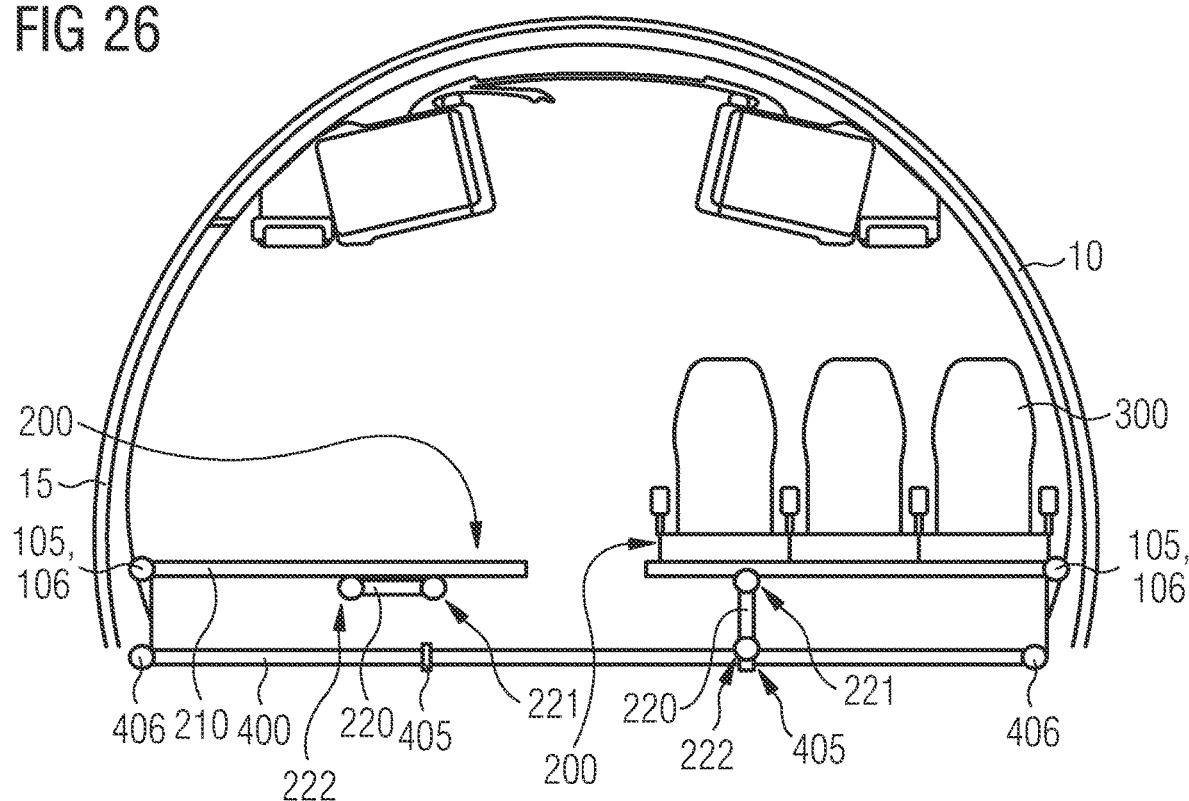
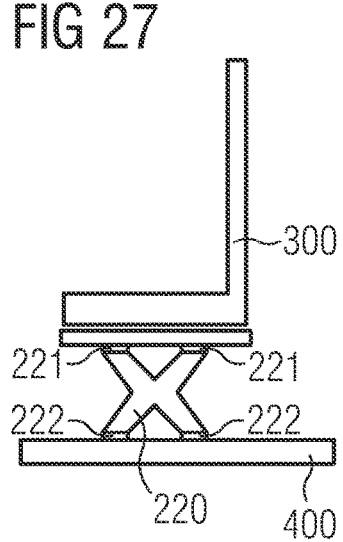

SEAT FRAME FASTENING ASSEMBLY, SEAT FRAME, VEHICLE PORTION AND VEHICLE HAVING A SEAT FRAME FASTENING ASSEMBLY

CROSS-REFERENCES TO RELATED APPLICATIONS

This application claims the benefit of the German patent application No. 10 2018 115 776.2 filed on Jun. 29, 2018, the entire disclosures of which are incorporated herein by way of reference.

FIELD OF THE INVENTION

The invention relates to a seat frame fastening assembly for lateral fastening of a seat frame in a vehicle and a seat frame, a vehicle portion and a vehicle having such a seat frame fastening assembly. In particular, the invention relates to a seat frame fastening assembly having a holding rail and a lateral holding element, wherein power- and/or data-transfer interfaces are arranged on the holding rail and the lateral holding element such that they correspond to one another when the lateral holding element is coupled to the holding rail.

BACKGROUND OF THE INVENTION

In most vehicles, in particular mass transport means, for example aircraft, trains, buses and ships, a plurality of seats and/or seat rows are arranged in the longitudinal direction of the vehicle. These are usually fastened to corresponding seat rails, which are assembled or integrated in a vehicle floor. The published application FR 2 935 682 A1 describes an aircraft seat row laterally fastened to the aircraft fuselage on the one hand and moreover, by a corresponding seat frame, to the aircraft floor on the other.

This manner of fastening seats and/or seat rows requires constant improvement to reduce weight in the vehicle and also assembly costs.

SUMMARY OF THE INVENTION

The invention is therefore based on an object of providing a seat frame fastening assembly, a seat frame having such a seat frame fastening assembly, a vehicle portion having such a seat frame and a vehicle having such a vehicle portion, whereby the seat fastening is simpler and the assembly costs are reduced.

According to a first aspect, a seat frame fastening assembly for laterally fastening a seat frame in a vehicle comprises a holding rail designed to be arranged in the longitudinal direction of the vehicle, and a lateral holding element designed to be laterally fastened to a seat frame and to be coupled to the holding rail. The holding rail and the lateral holding element coupled thereto enable a load to be introduced more easily into the supporting structure of the vehicle. For example, floor elements in the vehicle are normally laterally fastened to the vehicle body. The loads of a seat frame, in particular the increased loads in the event of a collision, must therefore be conducted into the vehicle body via the floor element. As a result of the laterally attached holding rail and holding element according to the present disclosure, the loads can be introduced directly into the vehicle body in a simpler manner, whereby the corresponding floor element can be designed to be less robust and therefore lighter.

The holding rail has, in particular, a holding structure whereby vertical loads can be conducted from the holding element into the vehicle body. For example, the holding rail has a cross-section having at least one horizontal portion or a non-vertical portion on which the holding element can be vertically supported at least by means of a corresponding portion. Furthermore, the cross-section of the holding rail can have a portion which extends vertically or non-horizontally so that the holding element can be supported in the horizontal direction by means of an appropriate portion. The holding rail can likewise be configured in such a way that the holding element can move freely in the longitudinal direction of the holding rail. Of course, stoppers can be attached to the holding rail or be provided on the holding element, which stoppers establish a force-fitting connection with the holding rail so that the holding element can also be fixed in the longitudinal direction of the holding rail.

The holding rail comprises a first power- and/or data-transfer interface, and the lateral holding element comprises a second power- and/or data-transfer interface. In this case the second power- and/or data-transfer interface can be arranged in the lateral holding element such that a position of the second power- and/or data-transfer interface corresponds to a position of the first power- and/or data-transfer interface when the lateral holding element is coupled to the holding rail. For example, the first power- and/or data-transfer interface can be located in a region of the holding rail opposite at least one portion of the holding element in a direction perpendicular to the longitudinal direction of the holding rail when the holding element is coupled to the holding rail. Therefore, a region in which the first power- and/or data-transfer interface is arranged can be provided in a cross-section of the holding rail. Likewise, a portion which comes very close to this portion of the holding rail when the holding rail and holding element are coupled can be provided in the holding element.

In this case, the two respective portions of the holding rail and the holding element do not have to contact one another. In other words, the first and second power- and/or data-transfer interfaces can be designed for wireless power and/or data-transfer. Therefore, power- and/or data-transfer devices which enable wireless transfer of electrical power and/or digital and analogue data can be provided in the respective power- and/or data-transfer interfaces. Of course, contact power- and/or data-transfer can be provided, wherein corresponding contacts of the respective power- and/or data-transfer interfaces contact one another when the lateral holding element is coupled to the holding rail.

The holding rail can furthermore have a cross-sectional profile which forms at least part of a fresh air line in one portion. For example, the cross-sectional profile can have a closed portion whereof the interior forms a fresh air line in the longitudinal direction of the holding rail. In the present disclosure, any description of a fresh air line can also relate to or refer to another fluid line. Of course, in addition to a fresh air line, a fluid line, for example an exhaust air line, a cold/hot air line or a water line, can also be integrated in the holding rail.

The holding rail can alternatively be formed by a fresh air line. In other words, a fresh air line is provided which has a very simple cross-sectional profile (for example a circular, elliptical or rectangular cross-sectional profile), whereof the interior serves as a fresh air line (or other fluid line). In addition to the lateral holding element, further elements, for example the power- and/or data-transfer interface of the holding rail, can also be fastened to such a holding rail by means of corresponding holding devices, in particular at the outer circumference of the holding rail.

The lateral holding element can optionally comprise a fresh air element designed to be fluidically coupled to the fresh air line when the lateral holding element is coupled to the holding rail. For example, the fresh air connection of the lateral holding element can penetrate into the fresh air line of the holding rail during the attachment of the lateral holding element to the holding rail and thereby establish a fluidic coupling. To this end, the fresh air line of the holding rail can have a self-closing opening through which the fresh air connection, for example in the form of one or more tubes, penetrates into the interior of the fresh air line and thereby establishes the fluidic coupling. In the present disclosure, any description of a fresh air connection can also relate to or refer to another fluid connection (for example for exhaust air, cold/hot air and/or water).

The lateral holding element can alternatively or additionally comprise a fresh air line portion designed to form a portion of the fresh air line when the lateral holding element is coupled to the holding rail. For example, the lateral holding element can comprise a portion which extends in the longitudinal direction to the holding rail when the lateral holding element is coupled to the holding rail. This portion of the lateral holding element has a (predominantly) closed cross-section so that it forms a fresh air line or a portion thereof. Furthermore, the fresh air connection of the lateral holding element can be integrated in this portion, i.e., the fresh air connection is fluidically coupled to the interior of the closed cross-section. This enables a simple design of the holding rail since it does not have to form a fresh air line over its entire longitudinal extent (i.e., it can have an open cross-section which is simpler to produce). The regions of the holding rail in which lateral holding elements are not attached can optionally have a closed cross-section or be designed to be closed by a cover element.

In a further design variant, the lateral holding element can have at least one portion which has a cross-section corresponding to a cross-section of the fresh air line in order to couple the holding element to the holding rail with form fit. This form-fitting coupling can take place on an outer side of the holding rail, and, in particular, an outer side of the fresh air line of the holding rail. This enables simple seating of the lateral holding element on the holding rail.

Of course, the lateral holding element can also have a portion inserted into the holding rail on an inner side of an open cross-section of the holding rail. In this design, the lateral holding element can comprise a portion which forms part of the fresh air line. For example, the open cross-section of the holding rail serves for receiving the lateral holding element and for forming a fresh air line, wherein, after the insertion of the lateral holding element of at least one seat frame, the other portions of the holding rail (in particular of the open cross-section thereof) must be provided with a cover. The covered portions of the holding rail and the inserted portions of the lateral holding element which are located between them thus form a continuous fresh air line.

In another design variant, the lateral holding element can have at least one portion which has a cross-section corresponding to a cross-section of the holding rail in order to couple the holding element to the holding rail with form fit. This form-fitting coupling can take place on an outer side or an inner side of the holding rail. To this end, the holding rail can have a cross-section which is partially open. For example, the holding rail has a hook-shaped portion, in which a corresponding portion of the lateral holding element can be suspended in order to couple the lateral holding element to the holding rail. The lateral holding element can optionally have a slide element (for example a roller) in this region in order to be displaced in the longitudinal direction of the holding rail in the suspended state. In addition to simple attachment of the lateral holding element to the holding rail, this also enables an alignment of the seat frame fastening assembly along the holding rail.

Alternatively to this, the holding rail can comprise a portion which forms an L-shaped cavity in cross-section. The lateral holding element has a corresponding curved or also L-shaped portion, which can be introduced into the corresponding portion of the holding rail. In this case, the two corresponding portions of the lateral holding element and the holding rail form at least two contact points (bearings), wherein one contact point in each case abuts against each limb of the L-shaped portion on the holding rail. In this case, the closed end of the L-shaped cavity in the state in which the holding rail is installed in the vehicle can point vertically upwards or downwards and the corresponding portion of the lateral holding element can likewise point upwards or downwards when the lateral holding element is coupled to the holding rail.

In a further design variant, the holding rail can have a window panel mount designed for fastening a window panel thereto. The window panel can represent an interior trim of the vehicle arranged above the holding rail in the installed state. As a result of the attachment to a corresponding mount of the holding rail, a modular construction of the interior equipment of the vehicle is possible as well as rapid installation of the interior equipment of the vehicle.

Furthermore, the holding rail can optionally have a footwell panel mount designed for fastening a footwell panel (also known as a dado panel) thereto. The footwell panel can likewise represent an interior trim of the vehicle arranged below the holding rail in the installed state and which can be installed simply and rapidly by means of the corresponding mount of the holding rail. The holding rail remains at least partially free between the window panel and the footwell panel so that the lateral holding element can be displaced/offset relative to the holding rail, even when the panels are installed.

According to a further aspect, a seat frame comprises a cross-bar designed for supporting a seat or a seat group, and a seat frame fastening assembly according to the first aspect or a design variant described in this regard. In this case, the seat frame fastening assembly is arranged at a lateral end of the cross-bar. Therefore, when the lateral holding element of the seat frame fastening assembly is coupled to the holding rail thereof, the seat frame can extend from the holding rail into an interior of the vehicle. In this case, the cross-bar is fastened laterally to the vehicle by the seat frame fastening assembly. In particular, loads in the longitudinal direction of the cross-bar and vertical loads in the installed state can be transferred to the vehicle body via the seat frame fastening assembly.

The cross-bar can furthermore be designed for detachably fastening the seat or the seat group thereto. For example, openings and/or receiving means can be correspondingly arranged on the cross-bar, in which openings and/or receiving means the seat or the seat group can be inserted by means of corresponding holding devices and/or can be fixed to the cross-bar. Detachable fastening here is understood to mean non-destructive detachment of the two components. Examples of a detachable fastening are a screw connection, a snap closure or the like. The detachable fastening enables a modular construction of the seat/seat group in the vehicle. In particular, the seat frame can be brought into the vehicle separately from the seat or the seat group and put together and assembled there. The individual components which have to be brought into the vehicle via a door or other opening are thus considerably smaller and lighter.

The seat frame can furthermore comprise a seat leg. The seat leg can have a joint at a first end, which joint is fastened to the cross-bar in a position spaced from the lateral end of the cross-bar at which the seat frame fastening assembly is arranged. In addition to the seat frame fastening assembly, the seat leg and the joint arranged thereon form a second bearing for the cross-bar and therefore for the seat or the seat group. In particular, vertical loads and horizontal loads perpendicular to the longitudinal direction of the cross-bar (i.e., forces in the longitudinal direction of the vehicle in the installed state) can be transferred to the vehicle floor here.

In contrast to the conventional seat frames, only a single connection point on the vehicle floor or only a single row of connection points arranged in the longitudinal direction of the vehicle is required. This enables a simpler and lighter design of the vehicle floor since this has to absorb fewer loads from the seat frame.

In a design variant of the seat frame, the seat leg has a locking device at a second end of the seat leg opposite the first end. The locking device can be designed to be fastened to a floor element of the vehicle. The locking device can be fastened, for example, to a corresponding locking element of the floor element. Such a locking element can be implemented in the form of a Douglas rail or individual locking elements integrated in the vehicle floor.

The seat leg can be mounted on the seat frame by means of the joint and can thus be brought very easily into the interior of the vehicle. For installation in the vehicle, the seat leg is unfolded by means of the joint and the seat frame can be installed and fastened on the seat leg via the seat frame fastening assembly (in particular, the lateral holding element) and via the locking device.

In a further design variant, the cross-bar can be rotatably connected to the lateral holding element of the seat frame fastening assembly. The rotatability can be realized via a corresponding ball joint or similar connection between the cross-bar and the lateral holding element and/or between the lateral holding element and the holding rail. In this case, the rotation of the cross-bar can take place in a horizontal plane or it can be a free rotational movement in the three-dimensional space. As a result of a rotation in a horizontal plane, angles other than zero (i.e., a non-parallel arrangement) between a longitudinal extent of the holding rail of the seat frame fastening assembly and a longitudinal direction of the vehicle, along which a plurality of locking elements are arranged for example, can be compensated. The cross-bar, and therefore the seat or the seat group, can thus be aligned relative to the longitudinal direction of the vehicle, for example perpendicularly to the longitudinal direction of the vehicle. As a result of a free rotational movement in space, differences and tolerances in the vertical range (height) between the floor element and holding rail of the seat frame fastening assembly can moreover be compensated. The cross-bar, and therefore the seat or the seat group, can thus be easily aligned in any manner relative to a horizontal plane and also relative to the longitudinal direction of the vehicle.

For height compensation (compensation in the vertical direction) of the cross-bar, the seat frame can furthermore comprise a height-compensating element. This can be attached, for example, to the seat leg or integrated in the seat leg. In the case of the latter design variant, the spacing between the joint and locking device of the seat leg can be altered.

In a further design variant, the seat frame comprises an extension element connected to the cross-bar to be displaceable in the longitudinal direction of the cross-bar. Therefore, the extension element can be displaced relative to the longitudinal direction of the cross-bar. For example, the cross-bar has, at least at the end remote from the seat frame fastening assembly, a cross-sectional shape which at least mostly surrounds an interior space (i.e., more than 50% of the circumference). The extension element can have a cross-sectional shape which corresponds to that of the cross-bar but is somewhat smaller. An outer side of the extension element can thus be arranged and displaced along an inner side of the cross-bar with form fit. According to an implementation variant, the cross-bar and the extension element each have a circular, elliptical or rectangular cross-section, wherein the cross-section of the extension element is dimensioned such that the outer side thereof abuts and can slide against the inner side of the cross-bar, or the inner side of the extension element abuts and can slide along the outer side of the cross-bar.

According to a further aspect, a vehicle portion comprises a floor element, a body element and a seat frame according to the second aspect or one of its design variants. In this case, the seat frame can be connected to the body element via the seat frame fastening assembly. To this end, the holding rail of the seat frame fastening assembly can be fastened to the body element or integrated therein. The body element can be a frame or stringer of the vehicle body. The holding rail of the seat frame fastening assembly can be attached thereto by means of screws, rivets, adhesive or another fastener.

In a design variant, the floor element can comprise connectors, which connect the floor element to the body element. The connecters are conventional connection elements with which the floor element is fastened to the body element (frame or stringer). As a result of introducing the load from the seat frame into the body element via the lateral holding element of the seat frame fastening assembly, fewer loads are transferred via the floor element so that the connectors of the floor element can also be designed to be smaller and/or lighter compared to conventional connection elements.

According to a further aspect, a vehicle comprises a vehicle portion according to the third aspect. The vehicle can be an aircraft, a bus, a train, a ship or other mass transport means. Of course, the vehicle can also be a car which comprises more than one seat row.

The designs, variants and aspects described here can furthermore be combined in any manner to include further design variants which are not explicitly described.

BRIEF DESCRIPTION OF THE DRAWINGS

Exemplary embodiments of the invention are described in more detail below with reference to the drawings.

FIG. 1 shows a perspective view of a seat group with a seat frame and seat frame fastening assembly, illustrated schematically, FIG. 2 shows an exploded view of the seat group with the seat frame and seat frame fastening assembly of FIG. 1, FIG. 4 shows a cross-sectional view of the seat frame fastening assembly of FIG. 1 according to a further design variant, illustrated schematically, FIG. 5 shows the sequence for installing a seat frame in a vehicle, illustrated schematically, FIG. 6 shows a perspective view of the installed seat frame of FIG. 5, illustrated schematically, FIG. 7 shows a cross-sectional view of the seat frame fastening assembly of FIG. 6, illustrated schematically, FIG. 8 shows a further design variant of a seat group with a seat frame and seat frame fastening assembly, illustrated schematically, FIGS. 26 and 27 show a front view and a side view of a vehicle portion with a floor element, body element and seat frame.

DETAILED DESCRIPTION OF THE PREFERRED EMBODIMENTS

Figure 3:
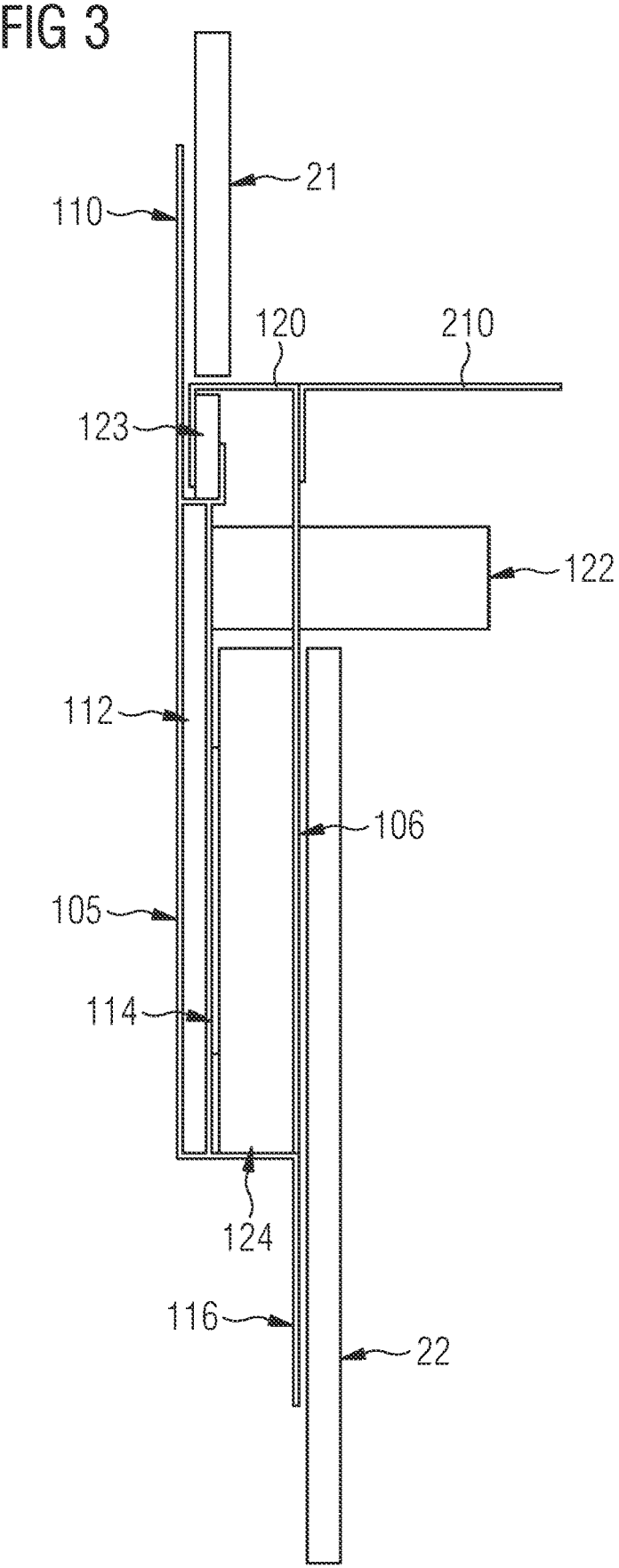
FIG. 3 shows a cross-sectional view of the seat frame fastening assembly of FIG. 1, illustrated schematically.
Figure 9:
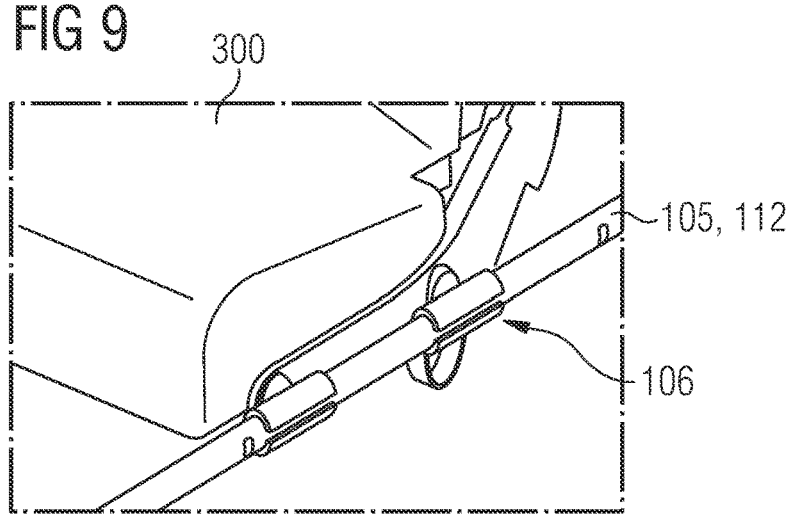
FIGS. 9 to 11 show detailed views of the seat group with the seat frame and seat frame fastening assembly of FIG. 8, illustrated schematically.
Figure 10:
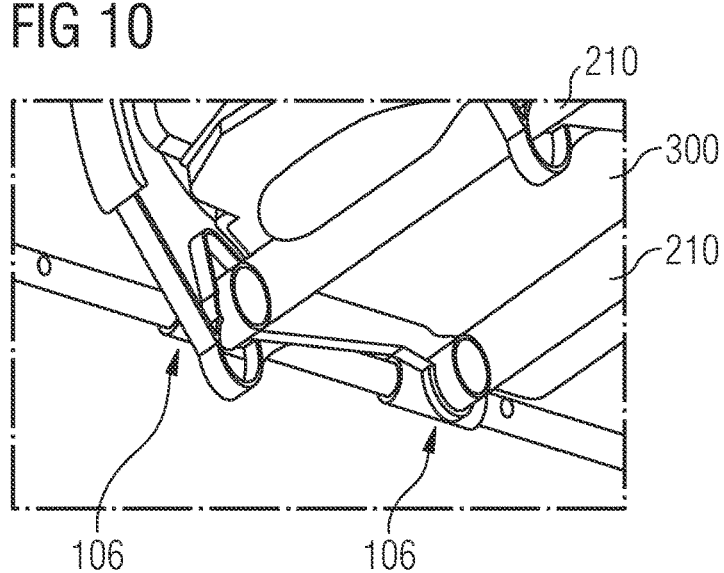

According to the present invention, a seat frame fastening assembly, a seat frame, a vehicle region and a vehicle with a holding rail and a lateral holding element and power- and/or data-transfer interfaces between the holding rail and holding element are described.

In a schematic illustration, FIG. 1 shows a perspective view of a vehicle portion 20 with a seat group 300 with seat frame 200 and seat frame fastening assembly 100, and FIG. 2 shows an exploded view of the seat group 300 with seat frame 200 and seat frame fastening assembly 100. The seat frame fastening assembly 100 comprises at least a holding rail 105 and a lateral holding element 106. In this case, the holding rail 105 can be arranged in the longitudinal direction of a vehicle (not illustrated). The lateral holding element 106 is designed to be laterally fastened to a seat frame 200 and to be coupled to the holding rail 105. As a result of the holding rail 105 arranged in the longitudinal direction of the vehicle, the lateral holding element 106 and therefore the seat frame 200 can be arranged in any position in the longitudinal direction of the vehicle.

As revealed in particular in FIGS. 2 and 3, the holding rail has a first power- and/or data-transfer interface (PDT) 114 and the lateral holding element 106 has a second power- and/or data-transfer interface (PDT) 124. In this case, the PDT 114 can extend along the entire holding rail 105 or be alternatively arranged in predetermined portions of the holding rail 105 in which a holding element 106 will be arranged.

The first and second PDTs 114, 124 are arranged on the holding rail or the lateral holding element such that a position of the second PDT 124 corresponds to a position of the first PDT 114 when the lateral holding element 106 is coupled to the holding rail 105. For example, the second PDT 124 can be located directly in front of the first PDT 114 when the holding element 106 and holding rail 105 are coupled, as illustrated in FIG. 3.

The first and second PDTs 114, 124 can be located at a spacing from one another in the arrangement illustrated in FIG. 3. In this case, the first and second PDTs 114, 124 are designed to be wireless. For example, power and/or data can be transferred between the first PDT 114 and second PDT 124 by means of an electrical field and/or a magnetic field. Alternatively or additionally, at least the second PDT 124 can have contacts (for example, contact pins) which contact a corresponding portion of the first PDT 114 when the holding element 106 and holding rail 105 are coupled.

The lateral holding element 106 can be moved in the longitudinal direction of the holding rail 105. For example, at least one roller 123 can be arranged on the lateral holding element 106 or the holding rail 105, enabling the holding element 106 to slide by means of, or on, this roller. It is, of course, possible to provide other sliding mechanisms which enable a displacement of the lateral holding element 106 along the holding rail 105 in the longitudinal direction thereof.

A fresh air line 112 can be integrated in the holding rail 105. To this end, the holding rail 105 can have a cross-sectional profile which forms at least part of a fresh air line 112 in one portion, as illustrated in FIG. 3. The cross-section, which is closed here, enables a fluid to pass through the holding rail 105. A fresh air connection 122, which is designed to be fluidically coupled to the fresh air line 112, can be arranged accordingly on the lateral holding element 106. To this end, the holding rail 105 can have closable openings in the fresh air line 112, into which openings at least one fresh air connection 122 of the lateral holding element 106 can protrude. In particular, when the lateral holding element 106 is coupled to the holding rail 105, the fresh air connection 122 can penetrate into such a closable opening in the fresh air line 112 and thereby establish the fluidic coupling with the interior of the profile of the holding rail 105. When the lateral holding element 106, and therefore the fresh air connection 122, is removed, the opening in the fresh air line 112 can be closed again, for example by means of a self-closing flap or other self-closing device.

Instead of, or in addition to, a fresh-air line 112, any other type of fluid line for a liquid and/or a gas can also be integrated in the holding rail 105. Therefore, in addition to fresh air, conditioned air, exhaust air, water or the like can also be conducted to or from a seat group 300 via the holding rail 105. Therefore, the holding rail 105 and the lateral holding element 106 can form an ATA Chapter 21 interface.

Of course, the holding rail 105 and the lateral holding element 106 can also be formed without a fresh air line 112 and without a fresh air connection 122. Such a design variant is illustrated in more detail in the cross-section in FIG. 4. The holding rail 105 and the lateral holding element 106 can therefore be designed more simply. For example, a closed cross-section is not required for the holding rail 105, which means that this can be produced more easily.

The lateral holding element 106 can be produced very easily in both design variants. For example an L-shaped or C-shaped cross-section is sufficient, it being possible to attach the second PDT 124 and optionally the fresh air connection 122 to the vertical main portion thereof. An overlap with a corresponding element of the holding rail 105 can be realized by a corresponding upper projection 120 so that a load can be introduced in the vertical direction from the lateral holding element 106 into the holding rail 105 (for example via a roller 123). The projection 120 can also have a vertical portion, whereby a load can be introduced horizontally from the lateral holding element 106 into the holding rail 105.

The holding rail 105 can furthermore have at least one panel mount, for example a window panel mount 110 or a footwell panel mount 116. Corresponding panels, i.e., interior trims for a vehicle, can be attached thereto. In FIG. 3, a window panel mount 110 and a footwell panel mount 116, to which a window panel 21 and a footwell panel 22 are fastened, are illustrated at least in part. The holding rail 105 can thus be attached directly to a primary structure of the vehicle (for example to a frame or stringer of the vehicle body) and the interior trim can be attached to the holding rail 105. This enables a simple construction of the corresponding vehicle portion 20 and simple access to the holding rail 105 so that the lateral holding element 106 can be displaced in the longitudinal direction of the vehicle at any time and coupled to the holding rail 105 at another point.

The lateral holding element 106 can be fastened to the seat frame 200, as illustrated in FIGS. 1, 3 and 4. For example, the lateral holding element 106 can be arranged and fastened at a lateral end of the seat frame 200, in particular at a lateral end of a cross-bar 210, while a seat leg 220 is arranged on the opposite side of the seat frame 200. At least one contact 230 can furthermore be provided on the seat frame 200, via which contact a power- and/or data connection to each seat of the seat group 300 can take place. This contact 230 can likewise be implemented wirelessly (magnetically or by means of an electrical field) or via wires (by means of mechanical contact).

The fresh air connection 122 can likewise be fluidically coupled to a fluid line (not illustrated) in the seat frame 200, wherein this fluid line conducts fresh air or another fluid to/from each seat of the seat group 300. Alternatively, the fresh air connection 122 or a fluid line connected thereto terminates in the region of the lateral holding element 106. Fresh air or another fluid can thus be supplied to, or discharged from, the vehicle interior in the region of the footwell panel 22.

A further design variant of a seat frame fastening assembly 100 is illustrated in FIGS. 5 to 7. In this case, the holding rail 105 has a cross-sectional profile which forms at least part of a fresh air line 112 in one portion, while the lateral holding element 106 comprises a fresh air line portion 121. In this case, the fresh air line portion 121 forms a portion of the lateral holding element 106 which has a cross-section corresponding to a cross-section of the holding rail 105 in order to couple the holding element 106 to the holding rail 105 with form fit.

As illustrated schematically in the sequence for installing a seat frame in a vehicle according to FIG. 5, a holding rail 105 is firstly provided and fastened, for example, to a vehicle body. The lateral holding element 106, and optionally a cross-bar 210 fastened thereto, is introduced into the corresponding cross-section (an open cross-section here) of the holding rail 105. In this case, the C-shaped cross-section (illustrated in FIG. 7) of the holding rail 105 corresponds to the elliptical cross-section of the lateral holding element 106, and, in particular, the fresh air line portion 121. In this case, a holding projection 125 can be threaded into a corresponding receiving space within the holding rail. By subsequently rotating the lateral holding element 106 (downward rotational movement of the cross-bar 210 towards the vehicle floor), the holding projection 125 can reach behind a corresponding portion of the C-shaped cross-sectional profile of the holding rail 105.

Subsequently or simultaneously, a further lateral holding element 106 with a cross-bar 210 can be introduced into the holding rail 105 and coupled thereto. A seat leg 220 can then be provided fastened to the cross-bar(s) 210 at an end thereof opposite the lateral holding element 106.

Finally, further cross-bars 210 with a lateral holding element 106 can be provided on the holding rail 105 and formed accordingly with a seat leg 220 to produce a seat frame and arranged behind one another in the vehicle in the longitudinal direction.

As revealed in particular in FIGS. 6 and 7, the fresh air line portion 121 of the lateral holding element 106 forms only part of a fresh air line. The other portion of a fresh air line, which is located in the longitudinal direction of the holding rail 105, is at least partially formed by the holding rail 105 itself. To produce a closed cross-section, a cover element 130 is attached to the holding rail 105. A continuous fresh air line 112 is therefore formed alternately in the region of the cover element 130 by the holding rail 105 and the cover element 130 and, adjoining this, by the fresh air line portion 121 of the lateral holding element 106. In the lower region (denoted by the reference sign 135 in FIG. 7) of the fresh air line 112, the cover element 130 can be attached directly to the holding rail 105 in a fluid-tight manner. Alternatively or additionally, a fixing device (not illustrated) for the holding element 106 can be provided in this region on the holding rail 105 at both ends of the fresh air line 121 of the holding element 106 (as seen in the longitudinal direction of the holding rail 105). The holding element 106, and, in particular, the fresh air line 121, can thus be fixed in the longitudinal direction of the holding rail 105 so that forces in the longitudinal direction of the holding rail 105 or the vehicle can also be transferred from the cross-bar 210 into the holding rail 106. This fixing element can moreover bring about a fluid-tight termination of the region 135 between the holding rail 106 and cover element 130, and, in particular, at the end faces of the fresh air line 121.

A fresh air connection 122 of the lateral holding element 106 can also be provided on the fresh air line 121. The fresh air connection 122 can be provided near to the cross-bar 210 or alternatively integrated in the cross-bar 210.

In this design variant, the first power- and/or data interface (PDT) 114 on the holding rail 105 can be provided in a first portion of the C-shaped cross-section of the holding rail. Likewise, the second PDT 124 can be provided on the fresh air line 121. Owing to the form-fitting connection between the holding rail 105 and holding element 106, the respective PDTs 114, 124 can contact one another and enable power- and/or data-transfer. Moreover, the first and second PDTs 114, 124 can be split so that, for example, power is transferred in the lower region of the first PDT 114 and data are transferred in an upper region 115 of the first PDT, or vice versa. The physical contact between the first and second PDTs 114, 124 can be established by the holding projection 125 in the upper region 115. Of course, the physical contact of the second PDT 124 can also be arranged on one or more external surfaces of the fresh air line 121, as illustrated in FIG. 6.

FIGS. 8 to 11 show a further design variant of a seat group 300 with a seat frame 200 and seat frame fastening assembly 100, illustrated schematically. In this case, the holding rail 105 is formed by a fresh air line 112. For example, the holding rail 105 is restricted to the fresh air line 112, i.e., it merely has a closed cross-section for guiding the fresh air or another fluid. The seat group 300 is held via at least one corresponding holding element 106 fastened externally to the holding rail 105, 112 with form fit, and a seat leg 220. The lateral holding element 106 can be formed according to a T-fitting of a pipeline, wherein a cross-bar 210 of the seat frame 200 is connected or integrated in one limb and the coupling to the holding rail 105, 112 takes place at the limb extending perpendicularly thereto. For the coupling to the holding rail 105, 112, the lateral holding element 106 can have a closed or open cross-section. While the closed cross-section enables better force transfer to the holding rail 105, 112, a holding element with an open cross-section can be attached more easily to the usually continuously extending holding rail 105, 112 (for example via upper and lower halves of a holding element 106 which reach around the holding rail 105, 112 and are connected to one another, as shown, in particular, in FIG. 9).

Figure 11:
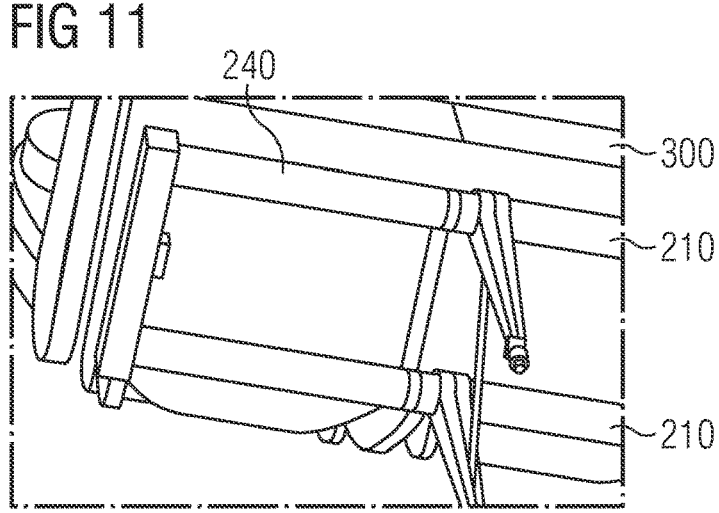

FIGS. 8 and 11 furthermore show an extension element 240, whereby the seat frame 200, and, in particular, the cross-bar 210, can assume a variable length in the longitudinal direction of the cross-bar 210. The extension element 240 is described in more detail with reference to FIGS. 20 to 25.

Figure 12:
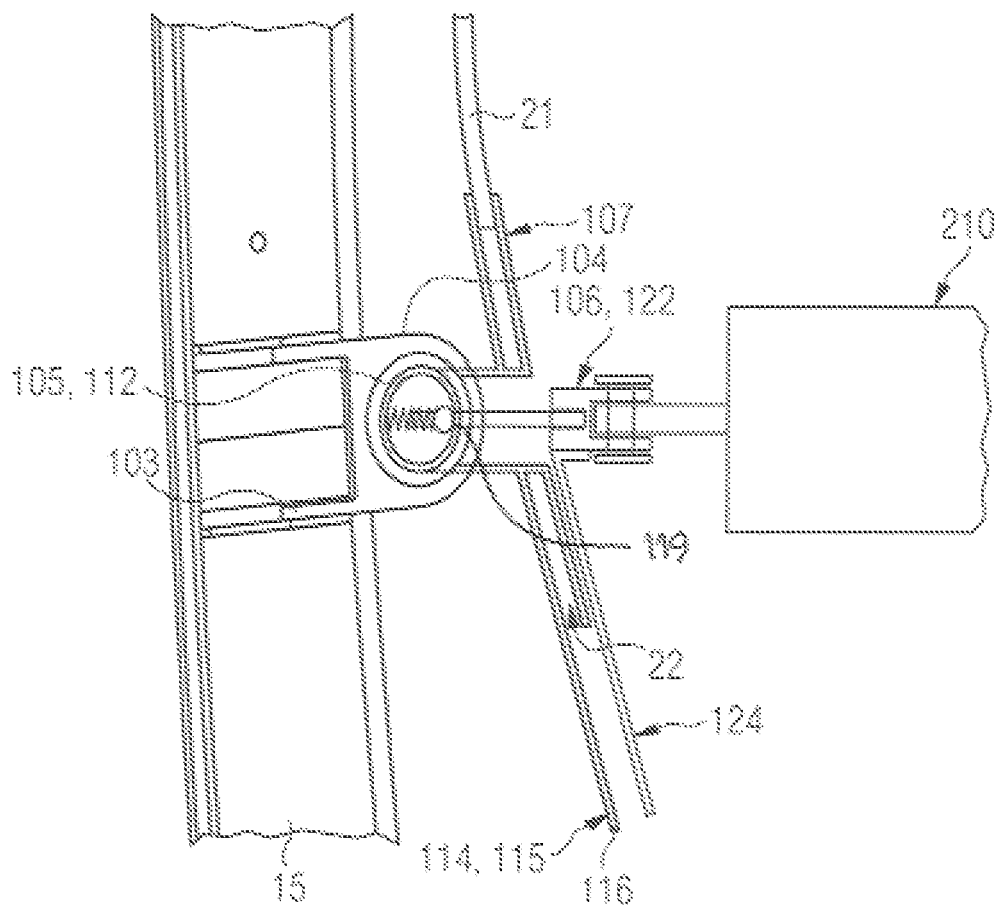
FIG. 12 shows a cross-sectional view of a design variant of a seat frame fastening assembly, illustrated schematically.
Figure 13:
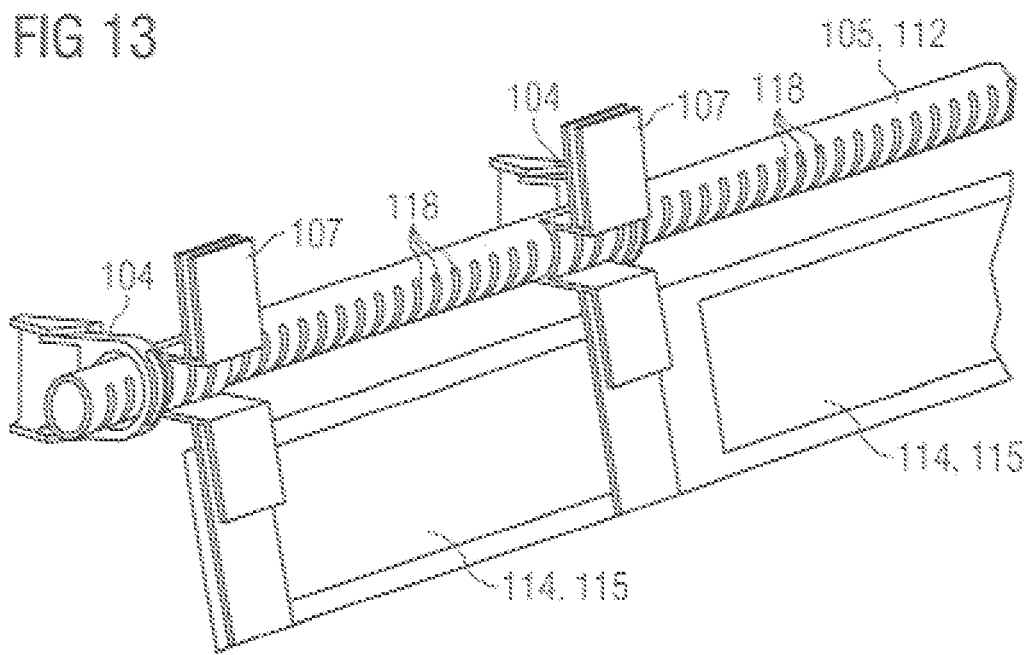
FIG. 13 shows a perspective view of the design variant of the seat frame fastening assembly of FIG. 12, illustrated schematically.

The holding rail 105, 112 according to design variants of FIGS. 8 to 11 is illustrated in more detail in FIGS. 12 and 13. Since the cross-section of the holding rail 105, 112 does not have projections, it is very simple to produce and it is possible to use conventional lines. To this end, however, a mount 104 is required for the fastening to the vehicle body 15. It is clear from FIG. 12 that the mount 104 has the advantage of compensating tolerances of the vehicle body 15 by means of webs 103. Therefore, the mount 104, for example with the webs 103, can be attached at a variable spacing from a center axis of a vehicle body element (a frame 15 in FIG. 12). The mount 104 furthermore has an annular portion into which the holding rail 105, 112 can be introduced and held therein.

A panel mount 107, which serves for receiving and/or attaching a window panel 21 and/or footwell panel 22, can be attached to an outer side of the holding rail 105, 112. Furthermore, as illustrated in FIGS. 12 and 13, the first PDT 114, 115 can be attached to the panel mount 107.

Both the panel mount 107 and the mount 104 can be coupled to the holding rail 105, 112 at predetermined spacings. To this end, predetermined portions 118, for example, can be provided on or in the holding rail 105, 112. For example, in the predetermined portions 118, a material or a material thickness of the holding rail 105, 112 can be selected such that a fastener (for example a screw) can be easily introduced into the predetermined portion 118. The panel mount 107 can be attached near to the mount 104 on the holding rail 105, 112. Alternatively, the mount 104 can also be designed in such a way that the panel mount 107 is attached thereto or the panel mount 107 is attached directly to the holding rail 105, 112, while the mount 104 surrounds part of the panel mount 107 on an outer side of the panel mount 107 remote from the holding rail 105, 112.

As revealed in FIG. 12, the same or different predetermined portions can also be suitable for fluidically coupling a fresh air connection 122 to the interior of the fresh air line 112. To this end, the fresh air line 112 can have a closable opening 119 through which a (for example) tubular fresh air connection 122 penetrates. The closable opening 119 can be implemented by a sealing element and spring element 117 (illustrated in FIGS. 12 and 14), which closes the closable opening 119 when the fresh air connection 122 is removed from the fresh air line 112. In a design variant, the closable opening 119 can also be designed to receive a fastener for the mount 104 or the panel mount 107 so that the fastener is securely fixed to the holding rail 105, 112.

The panel mount 107 can furthermore be designed for receiving at least one portion of the lateral holding element 106 so that at least vertical forces and optionally also horizontal forces can be transferred from the lateral holding element 106 to the panel mount 107 and therefore to the holding rail 105. For example, the panel mount 107 can be configured such that it receives the portion of the lateral holding element 106 with form fit. Furthermore, conventional fixing elements, for example screws, safety bolts, nuts, etc. can be provided to detachably fix the lateral holding element 106 to the panel mount 107.

Figure 14:
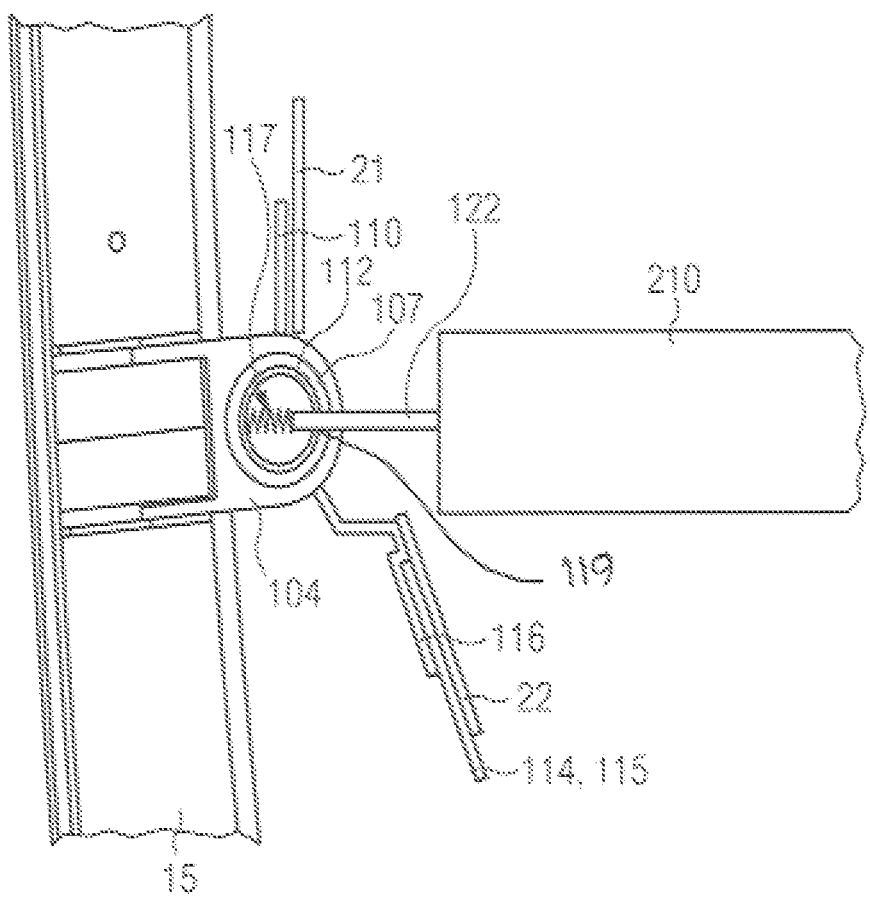
FIG. 14 shows a cross-sectional view of a further design variant of a seat frame fastening assembly, illustrated schematically.
Figure 15:
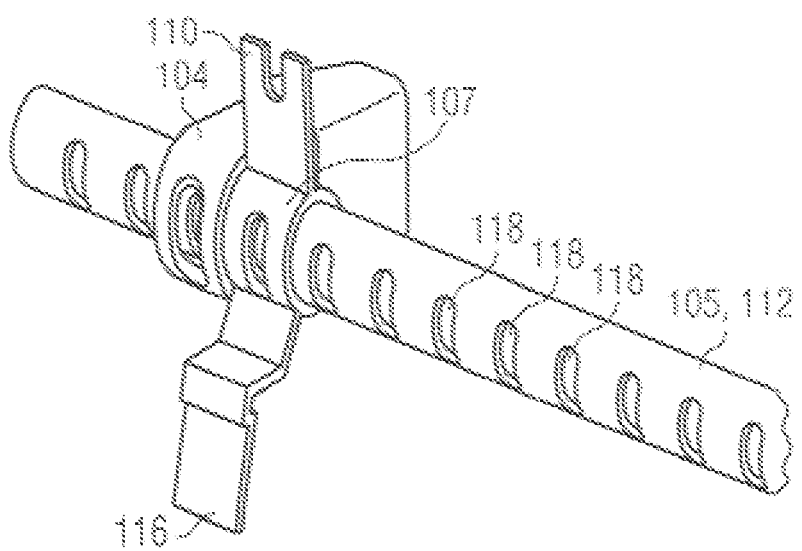
FIG. 15 shows a perspective view of the design variant of the seat frame fastening assembly of FIG. 14, illustrated schematically.
Figure 16:
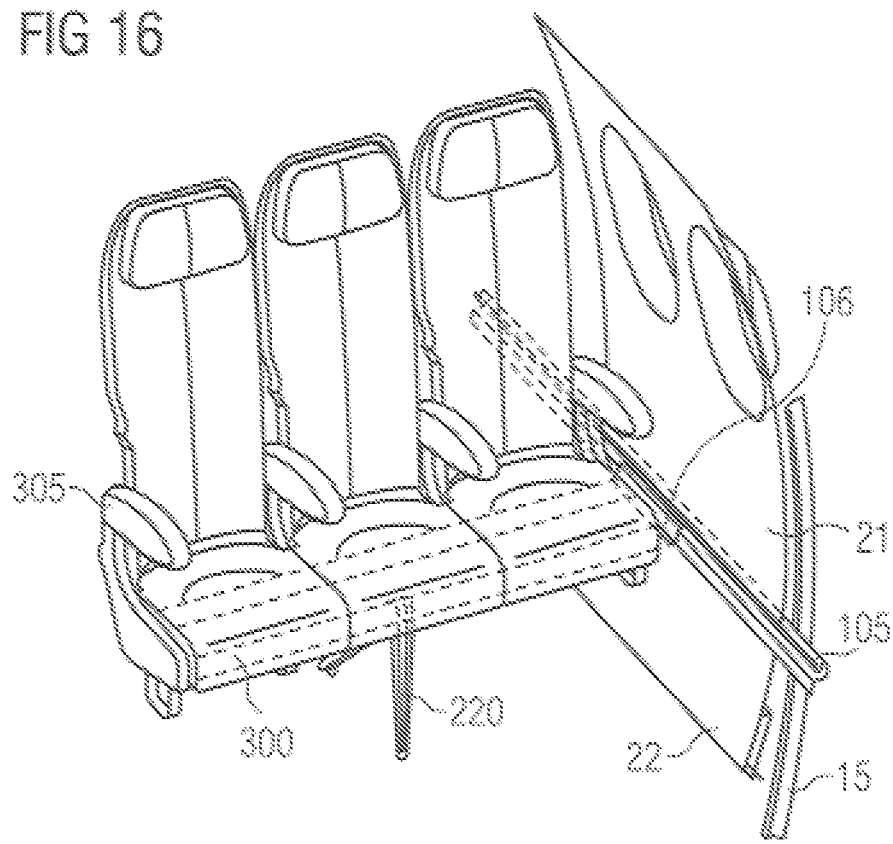
FIG. 16 shows a perspective view of a seat group with a seat frame and seat frame fastening assembly, illustrated schematically.

FIGS. 14 and 15 show a design variant of a holding rail 105 and a lateral holding element 106 very similar to that of FIGS. 12 and 13. Therefore, identical elements are denoted by the same reference signs and a description thereof is not repeated here. In contrast to the design variant according to FIG. 12, the panel mount 107 in the design variants according to FIGS. 14 and 15 has a closed cross-section, at least in some portions, which can surround the holding rail 105, 112 with form fit. In contrast to the design variant according to FIGS. 12 and 13, it is thus possible to dispense with additional fasteners. It is only necessary to provide a fastener or other holding mechanism between the panel mount 107 and holding rail 105, 112 in the event that loads are also to be transferred in the longitudinal direction of the holding rail 105, 112.

Furthermore, the panel mount 107 itself is also designed more simply. While, in the design variants according to FIGS. 12 and 13, the window panel 21 and footwell panel 22 are pushed into a clearance within the panel mount 107, in the design variant according to FIGS. 14 and 15, they abut against the side facing the interior of the vehicle and can be fastened thereto. This enables a visually more appealing impression of the visible region between the window panel 21 and footwell panel 22, since fewer portions of the panel mount 107 and the mount 104 are visible.

Figure 17:
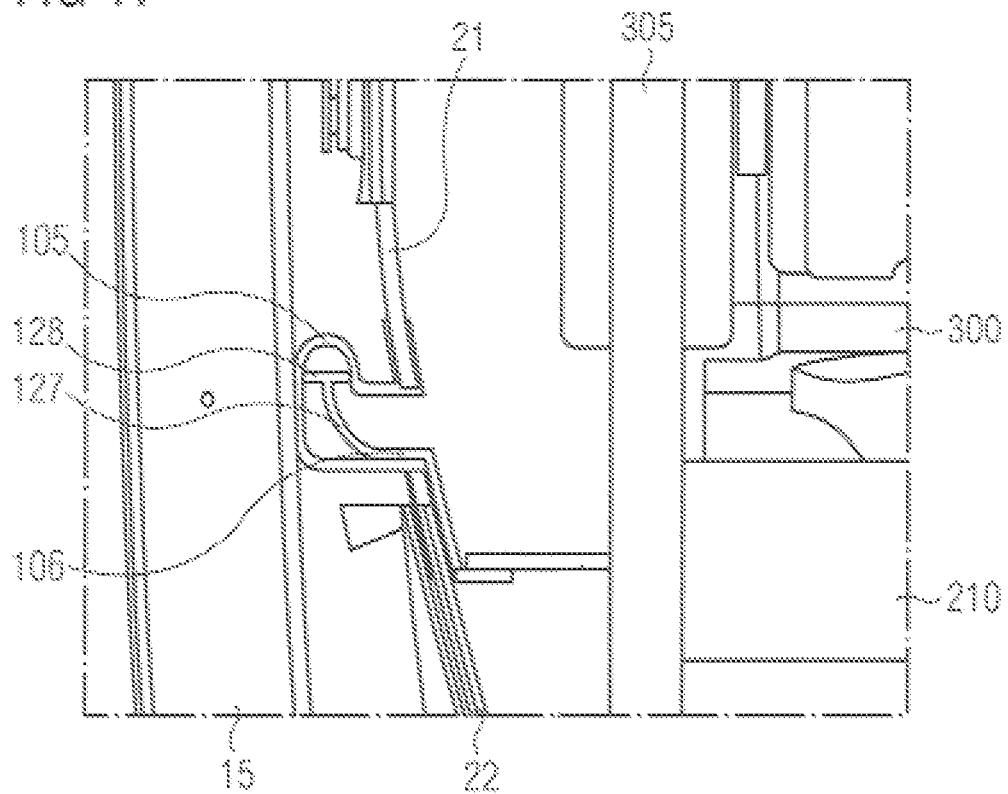
FIG. 17 shows a cross-sectional view of the design variant of the seat frame fastening assembly of FIG. 16, illustrated schematically.
Figure 18:
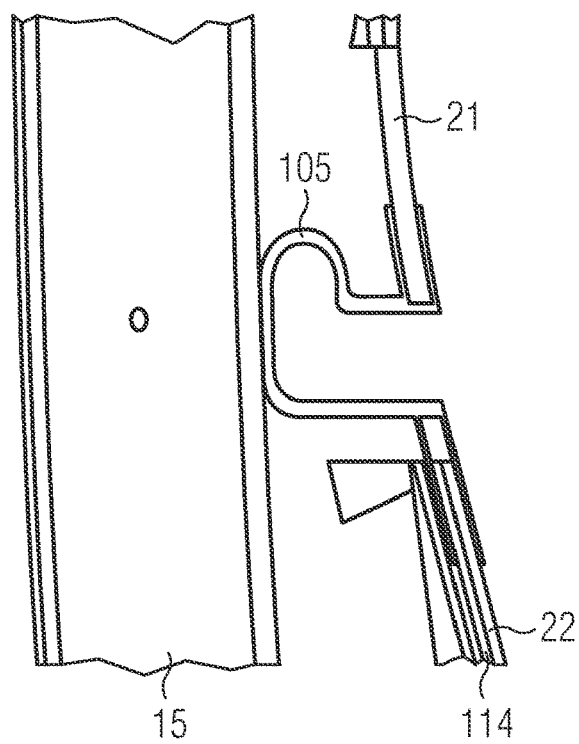
FIGS. 18 and 19 show cross-sectional views of the design variant of the seat frame fastening assembly of FIG. 17 in states during the installation of a seat frame.

In the design variant according to FIGS. 16 to 20, a further form of the holding rail 105 and the lateral holding element 106 is shown. In this case, the lateral holding element 106 likewise has a portion 127 which has a cross-section corresponding to a cross-section of the holding rail 105 in order to couple the holding element 106 to the holding rail 105 with form fit. In the illustrated design variant, the holding rail 105 has an L-shaped cross-section, wherein this forms an L-shaped interior. In this case, the closed limb of the L-shaped interior can be aligned upwards, as illustrated in FIG. 17, or alternatively downwards. The portion 127 of the lateral holding element 106 has a curvature and an end portion 128. Instead of a curvature, a polygonal shape can also be present.

Figure 19:
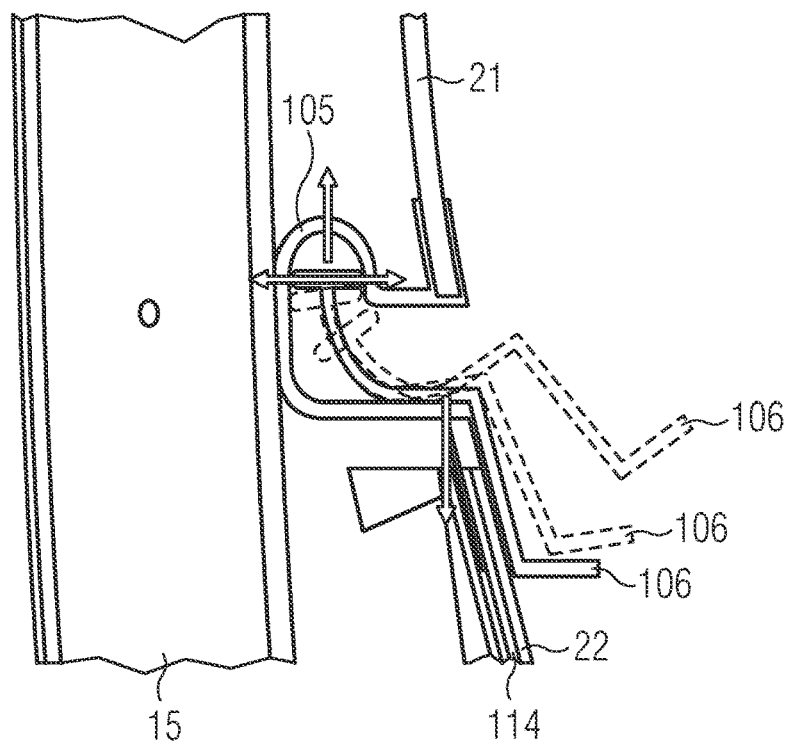

In this design variant, as illustrated in particular in FIG. 19, the portion 127 of the lateral holding element 106 is introduced into the L-shaped interior of the holding rail 105 and the lateral holding element 106 is rotated until the end portion 128 abuts against the holding rail 105 with form fit in the closed end of the L-shaped interior of the holding rail 105. Furthermore, a portion of the holding element 106 which adjoins the portion 127 can lie in another region of the holding rail 105 so that, in particular, horizontal and upwardly directed vertical forces can be transferred from the lateral holding element 106 into the holding rail 105 at the end portion 128 and downwardly directed vertical forces can be transferred from the lateral holding element 106 into the holding rail 105 at a portion adjoining the end portion, as illustrated by the dashed arrows.

In this design variant, the holding rail 105 can have cutouts for a window panel 21 and a footwell panel 22 so that the vehicle body 15, with the exception of the opening of the L-shaped interior of the holding rail 105, is covered completely by the window panel 21 and footwell panel 22.

Figure 20:
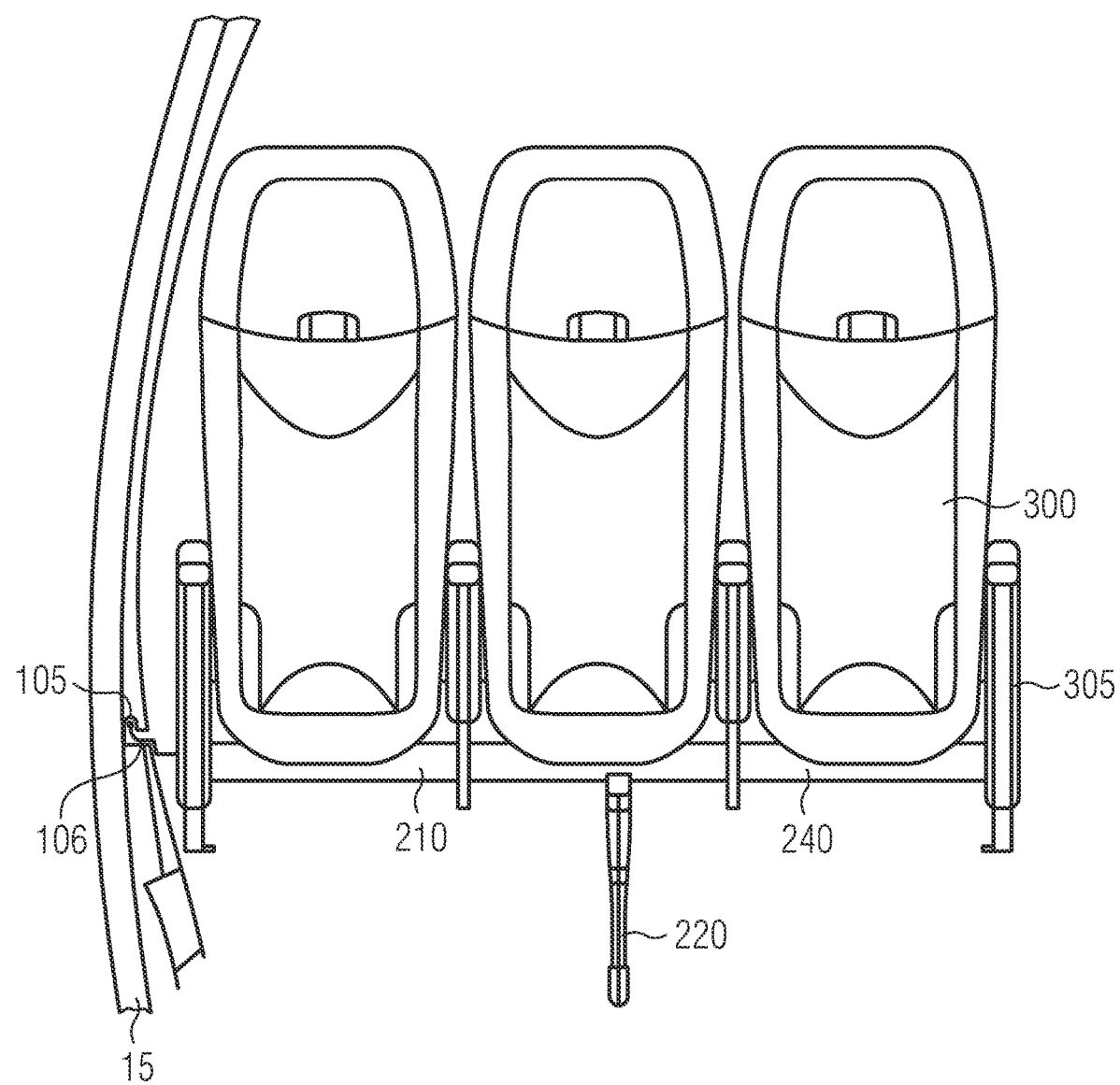
FIG. 20 shows a rear view of the seat group with the seat frame and seat frame fastening assembly of FIG. 16.

The extension element 240 of the seat frame 200 which is already shown in FIG. 11 is also shown in FIG. 20. This is explained in more detail with reference to FIGS. 21 to 25. The extension element 240 can be coupled to the cross-bar 210 of the seat frame 200 with form fit and/or force fit. In this case, the extension element 240 is configured such that it can be displaced relative to the cross-bar 210 in order to alter a length of the cross-bar 210 (see, in particular, the double-headed arrow in FIG. 21). For example, the extension element 240 can have a cross-section which can be introduced into a cross-section of the cross-bar 210 with form fit or which surrounds the cross-section of the cross-bar 210. Therefore, the extension element 240 can comprise at least one tube pushed onto or into a correspondingly dimensioned tube which forms the cross-bar 210. The extension element 240 can furthermore be designed for fastening an arm rest 305 of the seat group 300 thereto.

Figure 21:
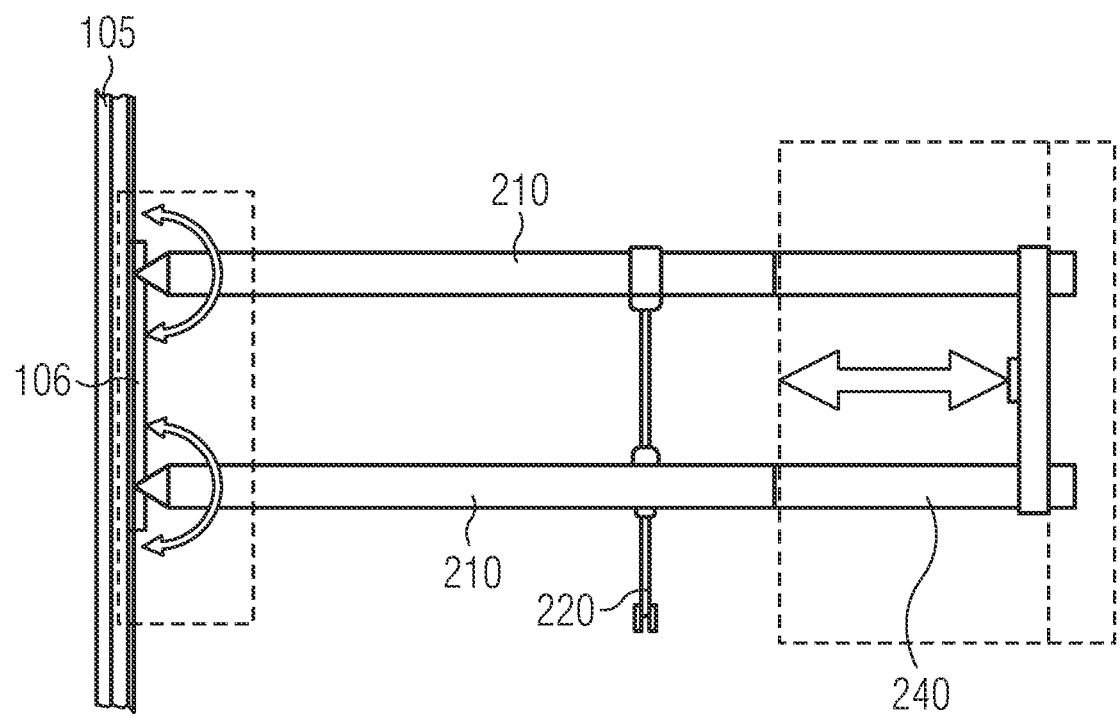
FIG. 21 shows a plan view of a design variant of a seat frame with an extension element, illustrated schematically.
Figure 22:
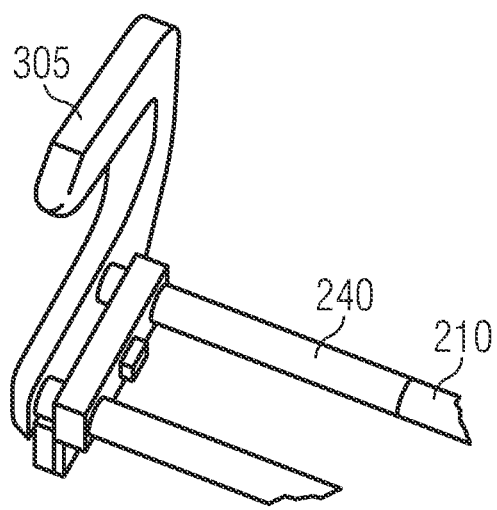
FIG. 22 shows a perspective view of an exemplary extension element, illustrated schematically.
Figure 23:
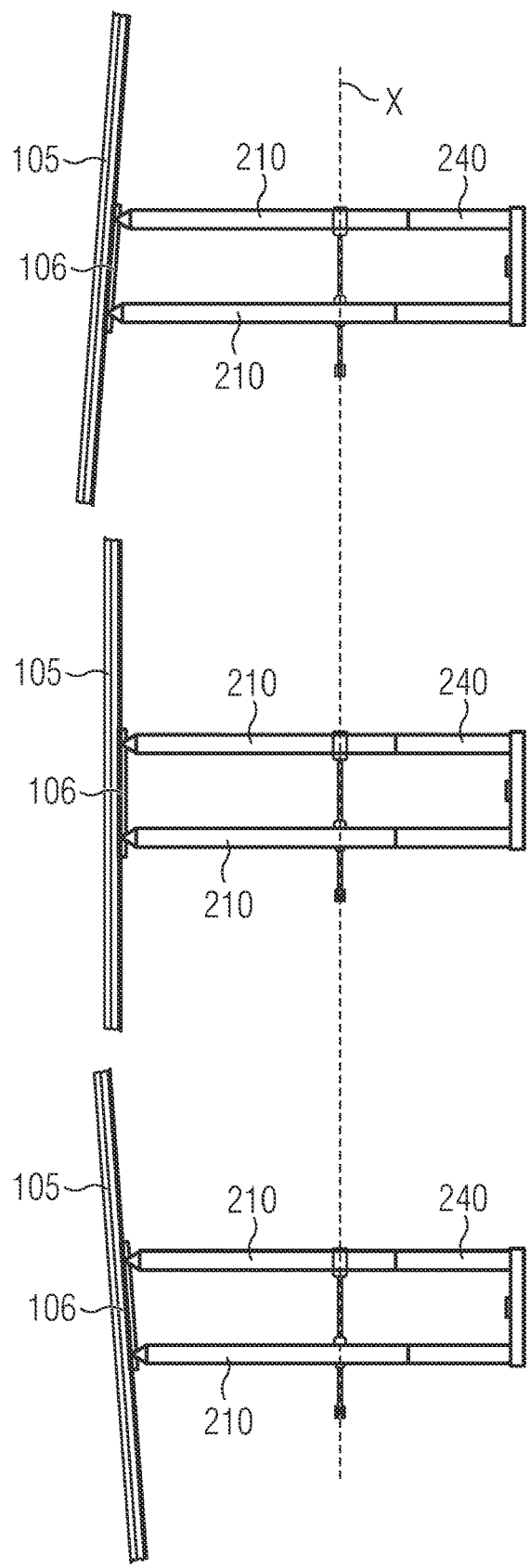
FIG. 23 shows a plurality of plan views of the seat frame with the extension element of FIG. 21, illustrated schematically.

The cross-bar 210 can furthermore be rotatably connected to the lateral holding element 106 of the seat frame fastening assembly 100, as illustrated by the curved double-headed arrows in FIG. 21. This has the advantage that, as shown in FIG. 23, a deviation of the body shape from a longitudinal direction of the vehicle (X axis) can be compensated. For example, the body shape tapers, in particular, in the front and rear region of the vehicle to the respective end of the vehicle so that the vehicle body tapers towards a center longitudinal axis of the vehicle. The resultant angle can be compensated by the rotatable connection between the cross-bar 210 and lateral holding element 106 and by the extension element 240.

Figure 24:
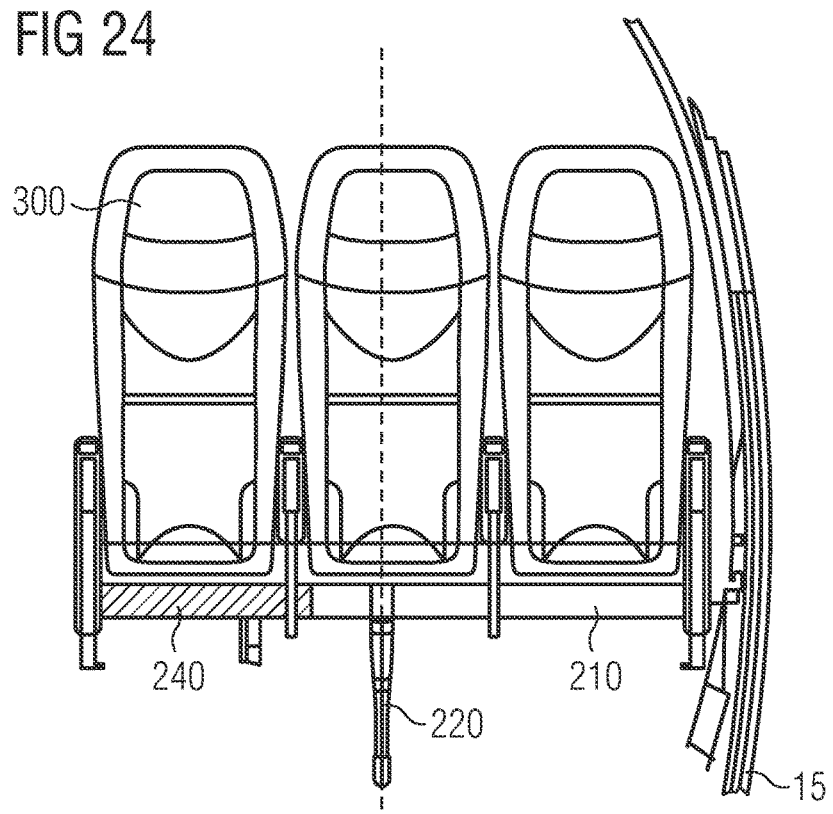
FIG. 24 shows a rear view of the seat frame with the extension element of FIG. 21 in a first design variant, illustrated schematically.
Figure 25:
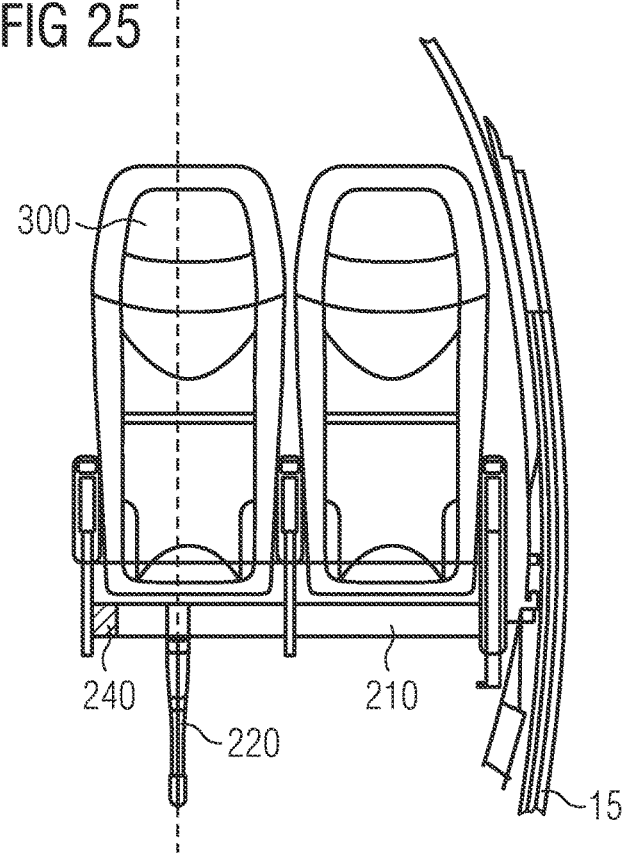
FIG. 25 shows a rear view of the seat frame with the extension element of FIG. 21 in a second design variant, illustrated schematically.

FIGS. 24 and 25 reveal that the extension element 240 also enables a variable division of the vehicle interior. When the extension element 240 is extended, the seat frame 200 can support a seat group having a plurality of seats (three seats in FIG. 24). When the extension element 240 is retracted, the seat frame 200 can support a seat group having a smaller number of seats (two seats in FIG. 25). In this case, the travel of the extension element 240 is at least one seat width. Rapid conversion of the vehicle can thus be realized. Alternatively, a seat frame 200 with cross-bar 210 can be used in various vehicle types. By attaching an extension element 240, the same seat frame 200 can therefore be used in another vehicle type in which more seats are contained.

FIGS. 26 and 27 finally show a front view (cross-sectional view) of the vehicle and a side view of a vehicle portion 20 with a floor element 400, body element 15 and seat frame 200. The vehicle 10 has vehicle body elements 15 to which a holding rail 105 with a lateral holding element 106 coupled thereto is fastened. Furthermore, a floor element 400 of the vehicle is fastened to the body elements 15 via corresponding holding devices 406. As illustrated in the left-hand region of FIG. 26, the seat frame 200 can be brought into the vehicle with the folded seat leg 220 (and without the seat group 300). After coupling the lateral holding element 106 to the holding rail 105, the seat leg 220 can be unfolded by means of the joint 221 and a locking device 222 of the seat leg 220 can be locked at a corresponding holding point 405 of the floor element 400 (see illustration in the right-hand region of FIG. 26). As a result of the first and second PDTs 114, 124, lines and corresponding connections for the seat groups 300 are not required in the floor element 400. These can be integrated in the seat frame 200 and the lateral holding element 106 and the holding rail 105.

The variants, designs and exemplary embodiments explained above merely serve for describing the claimed teaching, but do not restrict it to the variants, designs and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A seat frame fastening assembly for lateral fastening of a seat frame in a vehicle, wherein the seat frame fastening assembly comprises:
 a holding rail arranged in a longitudinal direction of the vehicle; and
 a lateral holding element laterally fastened to a seat frame and coupled to the holding rail, wherein
  the holding rail comprises at least one of a first power and/or data-transfer interface, and
  the lateral holding element comprises at least one of a second power and/or data-transfer interface,
 wherein the at least one of the second power and/or data-transfer interface is arranged in the lateral holding element such that a position of the at least one of the second power and/or data-transfer interface corresponds to a position of the at least one of the first power and/or data-transfer interface when the lateral holding element is coupled to the holding rail.

2. The seat frame fastening assembly according to claim 1, wherein the holding rail has a cross-sectional profile which forms at least part of a fresh air line in one portion.

3. The seat frame fastening assembly according to claim 2, wherein the lateral holding element comprises a fresh air line portion forming a portion of the fresh air line when the lateral holding element is coupled to the holding rail.

4. The seat frame fastening assembly according to claim 2, wherein the lateral holding element has at least one portion which has a cross-section corresponding to a cross-section of the fresh air line in order to couple the holding element to the holding rail with a form fit.

5. The seat frame fastening assembly according to claim 1, wherein the holding rail is formed by a fresh air line.

6. The seat frame fastening assembly according to claim 5, wherein the lateral holding element comprises a fresh air connection fluidically coupled to the fresh air line when the lateral holding element is coupled to the holding rail.

7. The seat frame fastening assembly according to claim 5, wherein the lateral holding element has at least one portion which has a cross-section corresponding to a cross-section of the fresh air line in order to couple the holding element to the holding rail with a form fit.

8. The seat frame fastening assembly according to claim 1, wherein the lateral holding element has at least one portion with a cross-section corresponding to a cross-section of the holding rail to couple the holding element to the holding rail with a form fit.

9. The seat frame fastening assembly according to claim 1, wherein the holding rail has a window panel mount for fastening a window panel thereto, and wherein the holding rail has a footwell panel mount for fastening a footwell panel thereto.

10. A seat frame comprising:
a cross-bar for supporting a seat or a seat group; and
a seat frame fastening assembly according to claim 1 arranged at a lateral end of the cross-bar.

11. The seat frame according to claim 10, wherein the cross-bar detachably fastens the seat or the seat group thereto.

12. The seat frame according to claim 10, furthermore comprising:
a seat leg, which has a joint at a first end, wherein the joint is fastened to the cross-bar, and wherein the seat leg is spaced from the lateral end of the cross-bar on which the seat frame fastening assembly is arranged.

13. The seat frame according to claim 12, wherein the seat leg has a locking device at a second end opposite the first end, which locking device is fastenable to a floor element of the vehicle.

14. The seat frame according to claim 10, wherein the cross-bar is rotatably connected to the lateral holding element of the seat frame fastening assembly.

15. The seat frame according to claim 10, wherein the lateral holding element is rotatably connected to the holding rail.

16. The seat frame according to claim 10, furthermore comprising:
an extension element connected to the cross-bar to be displaceable in the longitudinal direction of the cross-bar.

17. A vehicle portion comprising:
a floor element;
a body element; and
a seat frame according to claim 10,
wherein the seat frame is connected to the body element via the seat frame fastening assembly.

18. The vehicle portion according to claim 17, wherein the floor element comprises connectors which connect the floor element to the body element.

19. A vehicle having the vehicle portion according to claim 17.

* * * * *